US007329999B2

United States Patent
Oda et al.

(10) Patent No.: US 7,329,999 B2
(45) Date of Patent: Feb. 12, 2008

(54) LAMP LIGHTING CIRCUIT

(75) Inventors: Koji Oda, Hyogo (JP); Takahiro Hiraoka, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 21 days.

(21) Appl. No.: 11/299,902

(22) Filed: Dec. 13, 2005

(65) Prior Publication Data

US 2006/0125414 A1    Jun. 15, 2006

(30) Foreign Application Priority Data

Dec. 13, 2004    (JP) .............................. 2004-360005

(51) Int. Cl.
*G05F 1/00* (2006.01)
*H05B 37/00* (2006.01)

(52) U.S. Cl. ...................................... 315/291; 315/276
(58) Field of Classification Search ................ 315/224, 315/248, 254, 274, 276, 291, 307, 312, 326, 315/349, 354, DIG. 2, DIG. 5
See application file for complete search history.

(56) References Cited

U.S. PATENT DOCUMENTS 6,072,282 A * 6/2000 Adamson .................... 315/276
6,225,751 B1 * 5/2001 Komatsu ................. 315/209 R
6,246,173 B1 * 6/2001 Fischer et al. .......... 331/117 FE
6,680,583 B2 * 1/2004 Noda et al. ................... 315/224
6,958,919 B1 * 10/2005 Kung ........................... 363/17
7,180,251 B2 * 2/2007 van Eerden ................. 315/291

FOREIGN PATENT DOCUMENTS

| JP | 5-6794 A | 1/1993 |
| JP | 10-289791 A | 10/1998 |
| JP | 2001-85182 A | 3/2001 |

* cited by examiner

*Primary Examiner*—Shih-Chao Chen
*Assistant Examiner*—Minh Dieu A
(74) *Attorney, Agent, or Firm*—Rader, Fishman & Grauer, PLLC

(57) ABSTRACT

The lamp lighting circuit prevents a malfunction in which a lamp is tuned on momentarily during an initial stage of the power input. When the power source is lit, the malfunction prevention circuit prevents the activation of the oscillation circuit and/or the driving circuit 3a until when the output control circuit 5 starts normal operation and outputs the output control signal that controls the lighting/non-lighting of the lamp. When a lamp lighting command is input to the output control circuit, the output of the oscillation circuit is transmitted to the power control element via a driving circuit, and the power control element is driven. Consequently a voltage is generated on the secondary side coil of a boosting transformer so that the lamp 1 is lit.

12 Claims, 19 Drawing Sheets

LAMP LIGHTING CIRCUIT

TECHNICAL FIELD OF THE INVENTION

The present invention relates to a lighting circuit for a rare gas fluorescent lamp that is used as a light source for exposing a document, etc., in particular, a lighting circuit for a rare gas fluorescent lamp having a circuit structure that prevents malfunctions when the power is lit.

DESCRIPTION OF RELATED ART

Conventionally, a rare gas fluorescent lamp has been used as a light source that illuminates a document for an information processing apparatus, such as a facsimile or a photocopier, or a backlight light source for liquid crystal panel display. As an example of such a rare gas fluorescent lamp, an external electrode-type rare gas fluorescent gas lamp, in which a pair of strip-shaped electrodes that extend in the direction of the tube axis is provided, facing each other on the external wall of the straight glass pipe that comprises the discharging container, is known.

To supply electric power to the rare gas fluorescent lamp, a lighting circuit that is comprised of, for example, a DC power source, an inverter circuit that converts the output from the DC power source into a high frequency high voltage, and an output control circuit that controls the output from the inverter circuit in correspondence to the signal from outside, is required.

A representative boosting circuit that is provided in the lamp lighting circuit is a flyback type (hereinafter referred to as a flyback circuit). For example, a control circuit stabilizes the output energy relative to change of the input voltage, and stabilize the output energy by stabilizing the voltage that is applied to the FET element of the flyback circuit. Such a control circuit is provided in a single IC.

For example, Japanese Laid Open Patent No. H05-6794 discloses an inverter circuit that is comprised of a signal generation circuit, a power open/close circuit that turns on/off the power source by receiving signals from the signal generation circuit, and a high frequency transformer as the lighting circuit that can be used to light a fluorescent lamp.

In addition, Japanese Laid Open Patent H10-289791 discloses a lighting circuit that uses an inverter circuit IC to light the rare gas fluorescent lamp in which electrodes are located on the external surface of a discharge container. The inverter circuit IC is such that, when voltage from a power source is applied, a pulse signal is generated from a pulse generation circuit inside the inverter circuit IC, and then when the pulse signal turns on/off a switching element, high frequency high voltage is applied from the inverter circuit IC to the rare gas fluorescent lamp.

Furthermore, Japanese Laid Open Patent No. 2001-85182 discloses a lighting device in which an FET that inputs high frequency driving signal is connected to a boosting transformer that generates high frequency high voltage that is applied to an external electrode type rare gas fluorescent lamp, and a driving signal that opens/closes the FET gate is generated by a PWM control circuit. The PWM control circuit is part of a circuit in a single IC.

However, those ICs with a built-in inverter circuit included or a PWM control circuit, etc., are expensive and are not appropriate for inexpensive type products such as widely available photocopier machines, and a cost reduction of the entire inverter circuit has been desired. Therefore, without using an IC in which the entire control circuit is built-in, it is possible to consider using an inexpensive inverter circuit in which the oscillation circuit and inverting circuit are structured, using an inexpensive and widely available IC.

FIG. 17 shows a block diagram of the lamp lighting circuit 10 with an inexpensive structure using a widely available IC, and FIG. 18 shows an example of its detailed circuit structure.

As shown in FIG. 17, a power control element SW1 that is provided on the power control circuit 3 is connected in series to the primary side coil of a booster transformer 2 (hereinafter referred to as a transformer), and a rare gas fluorescent lamp 1 is connected to the secondary side coil of the transformer 2. Inside the power control circuit 3, a driving circuit 3a that drives a power control element SW1 is provided. The power control element SW1 is, for example, comprised of an FET, transistor or an IGBT.

The driving circuit 3a is driven by an output pulse signal (B) of an oscillation circuit 4, and the power control element SW1 is driven by a driving pulse signal (C) of the driving circuit 3a. When the power control element SW1 is lit, the electric current flows on the primary side of the transformer 2, and the energy is accumulated at the transformer 2. When the power control element SW1 is turned off, the energy that is accumulated at the transformer 2 imposes a voltage that is higher than the voltage thereby starting the discharge by the discharge lamp at the secondary side, by the flyback operation of the transformer 2, and therefore the rare gas fluorescent lamp (hereinafter referred simply as a lamp) 1 is lit.

The driving circuit 3a is, for example, comprised of, as shown in FIG. 18, a circuit in which switching elements SW2 and SW3 are connected in series. In addition, the oscillation circuit 4 is comprised of an oscillation circuit that has been generally known for example, as relaxation, and it generates a desired on/off duty signal. As an oscillation circuit 4, an inexpensive and widely available IC is sometimes used.

The output control circuit 5 is a circuit that controls the lamp 1 to be lit/off according to the lamp lighting control signal E that is given from outside, and as shown in FIG. 17, comprises a delaying circuit 5a and a switching circuit 5b.

When the lamp 1 is not lit, the output of the oscillation circuit 4 is grounded by making the switching circuit 5b of the output control circuit 5 conductive, and when the lamp 1 is lit, the switching circuit 5b becomes non-conductive and the output of the oscillation circuit 4 is input to the driving circuit 3a and switches the power control element SW1.

The delaying circuit 5a is provided so that the output control circuit 5 does not malfunction due to noise signals, etc. That is malfunction of the switching circuit 5b due to noise can be avoided by providing delaying circuit 5a, even if the lamp lighting control signal E is changed due to noises, etc.

Power voltage +V (A) at DC 24V, is supplied to the oscillation circuit 4, from a direct-current power source that is not shown in the figure, the driving circuit 3a, and the series circuit of the transformer 2 and the power control element SW1, and a smoothing capacitor C2 is connected to the power source line. The capacitor C2 can be provided on the direct-current power source side that is not shown in the figure.

FIG. 18 shows an example of the structure of the output control circuit 5. The output control circuit 5, for example, comprises a delaying circuit having a resistor R1 and a capacitor C1, and a switching circuit such as an open collector circuit, etc., having a switching element SW4 such as a transistor. The resistor R1 is connected to the power source line via the resistor R2, and the lamp lighting control signal E is input to the connecting point between the resistors R1 and R2. The lamp lighting control signal E is normally (when the lamp is not lit) at a high level and it becomes a low level (grounding level) when the lamp is lit. Therefore, when the lamp is not lit, a base current flows to the switching element SW4 so that the switching element SW4 is lit. At this time, the capacitor C1 is charged by Vbe of the switching element SW4. Therefore, the output B of the oscillation circuit 4 becomes the ground level and thus, the driving circuit 3a is not activated.

When the lamp lighting control signal becomes the ground level, the electrical charge that is charged in the capacitor C1 is discharged via the resistor R1. Therefore, the electrical potential at the point D becomes a low level and the switch element SW4 is turned off, and thus the output of the oscillation circuit 4 is input to the driving circuit 3a.

SUMMARY OF THE INVENTION

In a light source for an image scanning device, for example, a photocopier, cost requirement is very tight, and the oscillation circuit 4 of the lamp lighting circuit is sometimes structured by an inexpensive and widely-available IC, for example, a comparator.

When the oscillation circuit 4 is made up with such an inexpensive and widely-available IC, for example a comparator, the oscillator circuit 4 is activated earlier than the activation of the output control circuit 5 at an initial stage of the power input, that is, at time when the power source is lit, and the high voltage is output to the lamp connection side thereby generating problems such as a malfunction, in which the lamp is momentarily lit. This phenomenon is unique to the rare gas fluorescent lamp, in which light intensity startup time is short.

In addition, in some of photocopiers, etc., an operation is periodically switched to a standby operation, and sometimes a malfunction occurs during the switching thereby causing a problem such that a high voltage is generated in the lamp so that the rare gas fluorescent lamp illuminates.

The reason why in the lamp lighting circuit shown in FIGS. 17 and 18, such a malfunction is generated is explained by using a time chart of FIG. 19.

When the power source of the lamp lighting circuit is lit (at time point "ton" in FIG. 19), input power voltage A is gradually increased (See "Power voltage +V" in FIG. 19), and when it reaches the startup voltage V1 of the oscillation circuit 4 (at time point "t1" in FIG. 19), the oscillation circuit 4 is activated (See "Oscillation circuit output" and "Oscillation circuit operation status" in FIG. 19), and the signal B is generated from the oscillation circuit 4 (at time point "t1" and later in FIG. 19).

In this circuit, the power is supplied to the oscillation circuit 4 and the driving circuit 3a at the same time, when the power switch is lit, so that the driving circuit 3a is activated at the same time as the activation of the oscillation circuit 4 (See "Driving circuit output" and "Driving circuit operation status" in FIG. 19) and the output signal C is output from the driving circuit 3a.

The power voltage that is supplied to the output control circuit 5 gradually increases and the voltage at point D, which is the output of the delaying circuit 5a also gradually increases with some delay (See "Output of the delaying circuit of the output control circuit" in FIG. 19).

The switching circuit 5b of the output control circuit 5 is not activated until the power voltage A and the voltage at Point D reaches a sufficiently high level (at time point "t2") and it is activated for the first time at t2 (See "Switching status of the output control circuit" in FIG. 19).

In the case of the circuit shown in FIGS. 17 and 18, the capacitor C1 of the output control circuit 5 is not charged before the power is lit, and the voltage at point D is a low level (at time point t0 in FIG. 19). When the input power is applied at the time point "ton," the voltage at point D increases along with the increase in the input power voltage A as described above.

Here, although the oscillation circuit 4 is activated when the power voltage A is voltage V1 (at time point "t1"), in the case the switching circuit 5b of the output control circuit 5 is not activated unless the power voltage A increases so that the voltage A becomes V2 (at time point "t2"), the switching circuit 5b of the output control circuit 5 is not lit even if the oscillation circuit 4 is activated.

This problem is generated when there is difference in startup voltage between the oscillation circuit 4 and the output control circuit 5, and also when the output control circuit 5 is activated later than the activation of the oscillation circuit 4.

In such a case, the circuit is operated between the time points "t1" and "t2," as if a lighting command is provided (that is, the lighting control signal is at a low level).

Therefore, during the period of time when the circuit 5b of the output control circuit 5 is switched from an off state to an on state (the duration when the output from the output control circuit 5 goes from a high impedance to a low impedance), the lamp 1 is lit (the period from the time point "t1" to "t2").

At or after the time point "t2", the driving circuit 3a is not activated because the output control circuit 5 is at a low impedance and the output (C) is not generated from the driving circuit 3a.

In addition, when a lighting command is input from the outside at time point "t3," operation set forth below is carried out.

To light the lamp 1 by the command from the outside, the lighting command is input to the lamp lighting circuit and the lighting control signal E is changed from a high level to a low level (See "Lighting control signal" in FIG. 19).

By doing so, the electrical potential that is charged in the capacitor C1 of the delaying circuit 5a is discharged so that the switching circuit 5b is turned off, and the output becomes a high impedance and therefore, an output (C) is generated from the driving circuit 3a, so that the power control device SW1 is driven.

In FIG. 19, although waveforms of the power voltage A and the voltage at the point D which is the output of the delaying circuit 5a, are similar to each other, when the output control circuit 5 has the circuit structure shown in FIG. 18 and the capacitor C1 is inserted between the emitter and base in order to prevent the malfunctioning of the switching element SW4, the time constant circuit of RC is formed so that the startup of the voltage at the point D is delayed, compared to the startup of the input power voltage A.

As a result, the activation of the output control circuit 5 is delayed. Therefore, the interval between time points "t1" and "t2" is enlarged and the lighting time of the lamp due to a malfunction is extended. In addition, even if the voltage that starts the operation of the oscillation circuit 4 and the driving circuit 3a, and the voltage that starts the operation of the output control circuit 5 are the same, the timing at which the output of the switching circuit of the output control circuit 5 becomes a low level is delayed from the activation of the oscillation circuit 4 and the driving circuit 3a, thereby causing the false lighting of the lamp.

Although the boosting circuit and the flyback circuit are used in the above description, when a push/pull-type circuit (hereinafter referred to as a push/pull circuit) is used, the same problem is generated.

The objective of the present invention is to provide a lamp lighting circuit capable of preventing the malfunction in which the lamp is lit during the initial stage of the power input, even when inexpensive circuit elements are used for the lamp lighting circuit.

The above-mentioned problem is solved as set forth below.

The present lamp lighting circuit for a rare gas fluorescent gas lamp having electrodes, in which at least one of the electrodes is provided on an external surface of a discharge container, and a fluorescent layer is provided inside of the container, and an excimer light generated by discharge is used, the lamp lighting circuit, comprises an oscillation circuit, a power control circuit having a power control element, a boosting transformer that generates a high voltage applied to the rare gas fluorescent gas lamp according to switching of the power control element, wherein the power control element is controlled by the oscillation circuit, and transmits power to a boosting transformer, and an output control circuit that controls lighting of the rare gas fluorescent lamp, wherein the lighting circuit has a malfunction prevention circuit that inactivates lighting operation of the lamp after the power is lit until the output control circuit starts normal operation.

The malfunction prevention circuit that inactivates the lighting operation of the lamp may comprise a delaying circuit that delays supply of the power to the oscillation circuit and/or power control circuit until the output control circuit starts normal operation, and the power supply to the oscillation circuit and/or power control circuit is delayed compared to supply of the power to the output control circuit. By doing so, the oscillation circuit and/or power control circuit are not activated before the output control circuit is activated, thereby preventing a malfunction such as the lamp being lit momentarily during the initial stage of the power input.

Further, the delaying circuit may comprise a constant voltage diode that shifts the level of the power voltage that increases along with passage of time. In other words, the power circuit normally comprises a capacitor for smoothing and the power voltage increases along with time. Therefore, by supplying power to the oscillation circuit and/or power control circuit via the constant voltage diode that operates as a level shift circuit, the supply of the power to the oscillation circuit and/or power control circuit can be delayed compared to the supply of the power to the output control circuit.

In the present lamp lighting circuit, the following effect can be obtained:

(1) Since the present malfunction prevention circuit inactivates the lighting operation of the lamp after the power is lit and until the output control circuit starts operating, it can securely prevent the lamp from being lit momentarily during the initial power input even where the oscillation circuit or power control circuit operates before the output control circuit is activated after the power is lit.

(2) The present malfunction prevention circuit comprises a delaying circuit that delays the power supply to the oscillation circuit and/or power control circuit until the output control circuit operates properly, thereby preventing the lamp from being lit momentarily during the initial power input by adding a relatively simple circuit.

In particular, since the power voltage usually increases along with time, it is possible to prevent the lamp from being lit momentarily at the initial state of power input by shifting the level of the power voltage by using the constant voltage diode, and by supplying power to the oscillation circuit and/or the power control circuit so that the power to be supplied to the oscillation circuit and/or the power control circuit can be virtually delayed. Thus, the malfunction can be prevented by just adding an extremely simple circuit.

DESCRIPTION OF THE DRAWINGS

For a more complete understanding of the present circuit, and the advantages thereof, reference is now made to the following description taken in conjunction with the accompanying drawings, in which.

DETAILED DESCRIPTION OF THE INVENTION

While the appended claims are not limited to the illustrated embodiment, an appreciation of various aspects of the present lamp lighting circuit is best gained through a discussion of various examples thereof.

Figure 1:
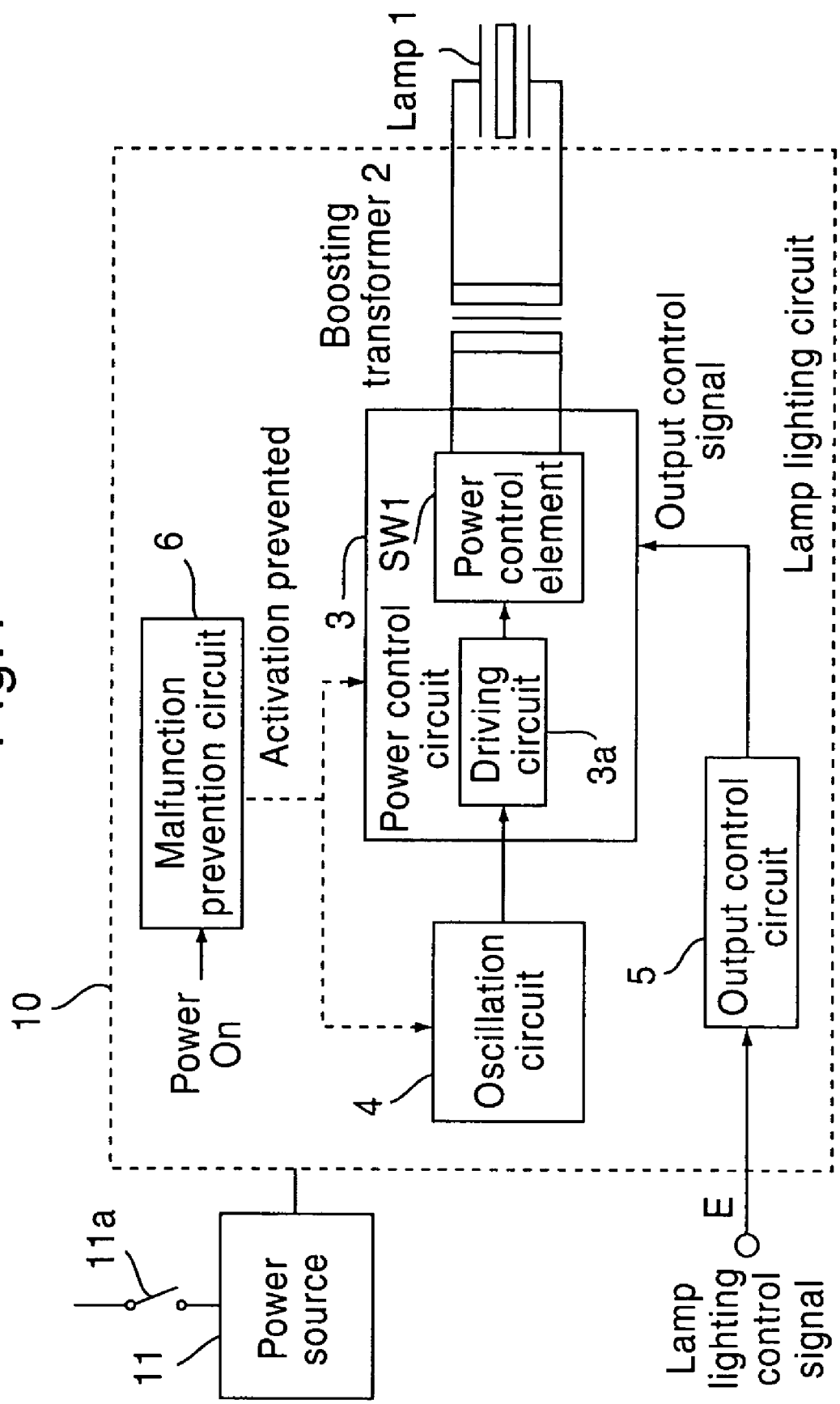
FIG. 1 is a view that shows the basic structure of a first embodiment of the lamp lighting circuit.

FIG. 1 shows the basic structure of the present light lighting circuit.

In FIG. 1, a power source 11 is connected to a lamp lighting circuit 10. When the power switch 11a is lit, for example, a direct voltage of DC 24V is supplied from the power source 11 to the lamp lighting circuit 10. A smoothing capacitor, etc., is provided in the power source 11 and when the power source switch 11a is lit, the direct voltage that is supplied from the power source 11 is gradually increased along with time.

The lamp lighting circuit 10 comprises an oscillation circuit 4, a power control circuit 3 and a boosting transformer 2. The power control circuit 3 is connected in series to the primary side coil of the transformer 2, and a rare gas fluorescent lamp 1 is connected to the secondary side coil of the transformer 2. In the power control circuit 3, a driving circuit 3a that drives a power control element SW1 is provided.

The driving circuit 3a is driven by an output pulse signal of the oscillation circuit 4, and the power control element SW1 that is provided in the power control circuit 3 is driven by a driving pulse signal of the driving circuit 3a so that the rare gas fluorescent lamp 1 is lit.

An output control circuit 5 controls the lighting/non-lighting of lamp 1 in response to a lamp lighting control signal E that is input from the outside.

In order to prevent a malfunction such as the lamp being lit momentarily at the initial power input as described above, a malfunction prevention circuit 6 is provided in the lamp lighting circuit.

When the power source is supplied, the malfunction prevention circuit 6 prevents the activation of the oscillation circuit 4 and/or the driving circuit 3a of the power control circuit 3 until the output control circuit 5 starts proper (normal) operation and outputs the output control signal for controlling the lighting/non-lighting of the lamp 1 in response to the lamp lighting control signal E.

Therefore, the oscillation circuit 4 and the driving circuit 3a are not activated before the output control circuit 5 is activated at the initial stage of the power input. And thus, the lamp 1 is not lit at the initial stage of the power input.

Next, a detailed example of the structure of the present lamp lighting circuit is described below.

Figure 2:
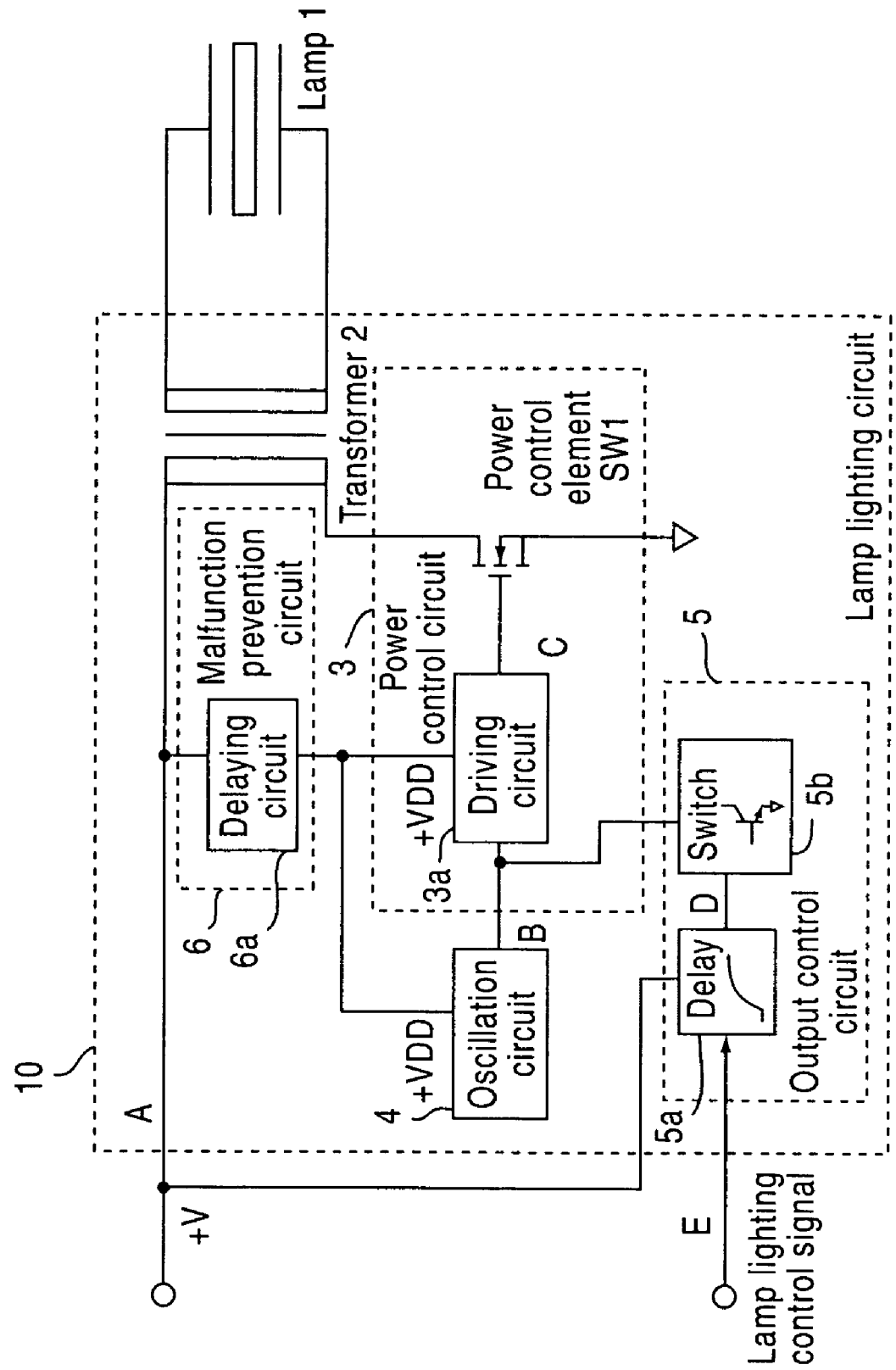
FIG. 2 is a block diagram of the first embodiment.
Figure 3:
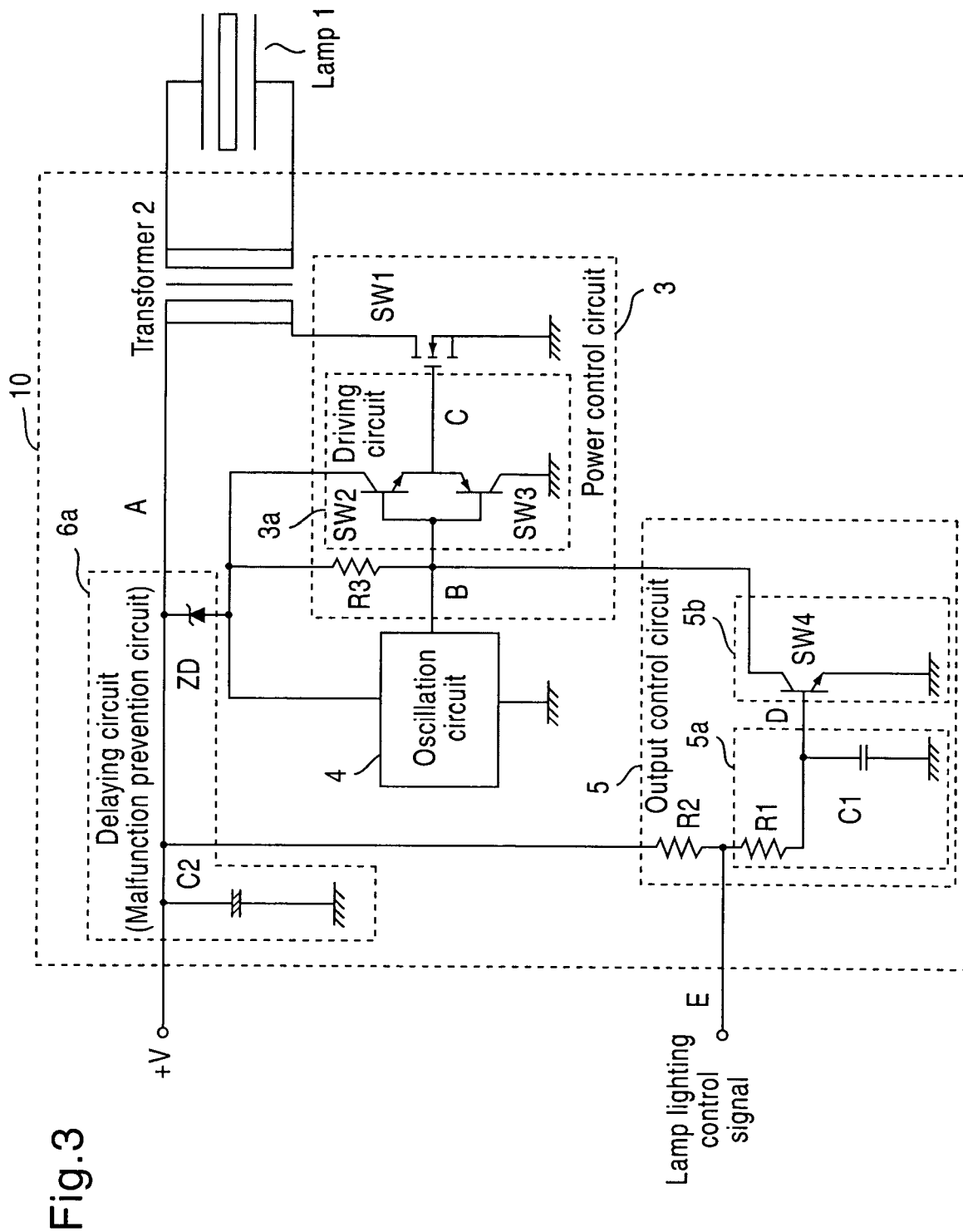
FIG. 3 is view that shows a detailed example of the structure of the first embodiment.

FIG. 2 is a block diagram of the lamp lighting circuit according to a first embodiment and FIG. 3 is a view that shows a detailed example of a circuit structure thereof.

Figure 17:
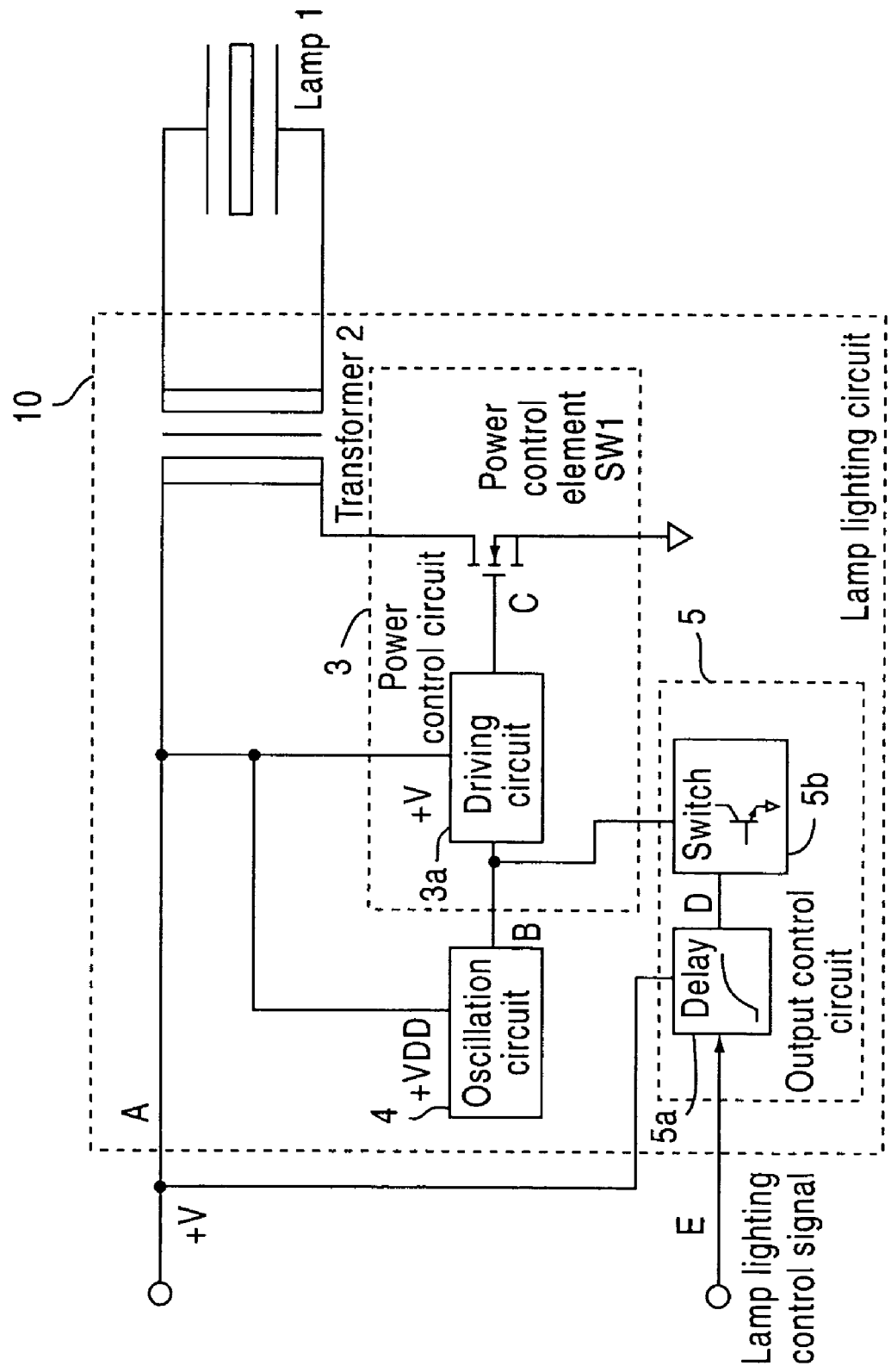
FIG. 17 is a block diagram of a conventional lamp lighting circuit.
Figure 18:
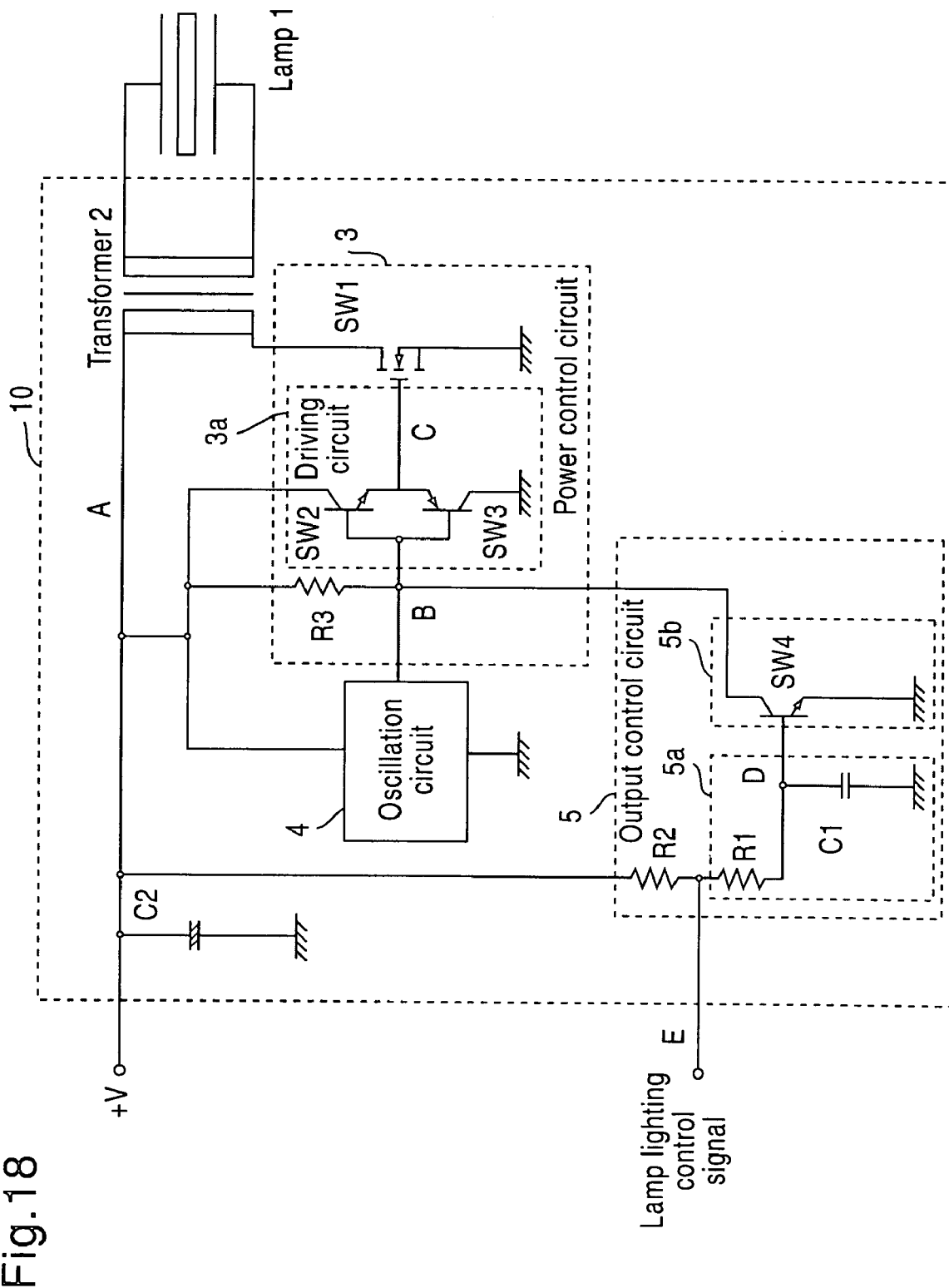
FIG. 18 is a view that shows a detailed example of the circuit structure of a conventional lamp lighting circuit.
Figure 19:
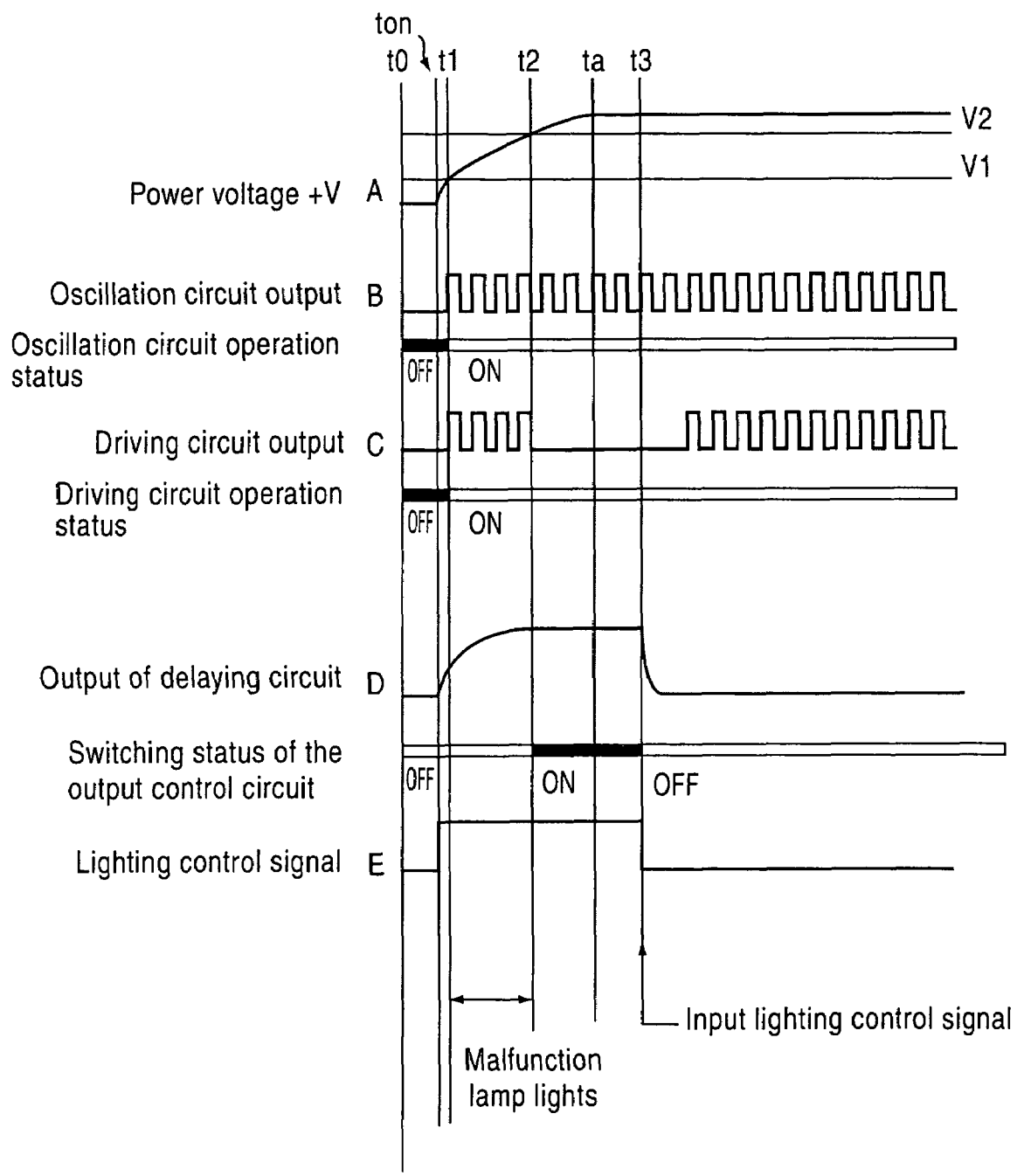
FIG. 19 is a time chart for explaining an operation of the conventional lamp lighting circuit.

The structure of the oscillation circuit 4, the power control circuit 3, and the output control circuit 5 shown in FIGS. 2 and 3 are similar to those shown in FIGS. 17 and 18, and as shown in FIGS. 2 and 3, the power control element SW1 provided in the power control circuit 3 is connected in series to the primary side coil of the transformer 2, and the rare gas fluorescent lamp 1 is connected to the secondary side coil of the transformer 2. The driving circuit 3a for driving the power control element SW1 is also provided in the power control circuit 3. The power control element SW1 comprises, for example, an FET, a transistor or an IGBT.

The driving circuit 3a is driven by an output pulse signal (B) of the oscillation circuit 4, and the power control element SW1 is driven by a driving pulse signal (C) of the driving circuit 3a. When the power control element SW1 is lit, electric current flows through the primary side coil of the transformer 2, and energy is accumulated in the transformer 2. When the power control element SW1 is turned off, the energy accumulated in the transformer 2 generates voltage that is higher than the discharge starting voltage of the discharge lamp 1, in the secondary side coil due to the flyback action of the transformer 2 so that the lamp 1 is lit.

The driving circuit 3a, for example, as shown in FIG. 3, comprises a circuit in which switching elements SW2 and SW3 are in series connected. In addition, the oscillation circuit 4 comprises, for example, an inexpensive and widely-available IC from which a desired on/off duty signal(s) is output.

The output control circuit 5 comprises a delaying circuit 5a and a switching circuit 5b that controls the lighting/light-out of the lamp 1 in response to the lamp lighting control signal E that is input from the outside so that the lamp is selectively lit.

According to the present embodiment, an output terminal of the switching circuit 5b of the output control circuit 5 is connected to an output terminal (B) of the oscillation circuit 4, and when the lamp 1 is not lit, as described above, the switching circuit 5b of the output control circuit 5 is set in a conductive state, and an output terminal of the oscillation circuit 4 is grounded. When the lamp 1 is lit, the switching circuit 5b is set in a non-conductive state, and the output signal from the. oscillation circuit 4 is input to the driving circuit 3a thereby turning on and off the power control element SW1.

A power voltage +V (A) of DC24V is supplied to the oscillation circuit 4, the driving circuit 3a and the series circuit comprising the transformer 2 and the power control element SW1 from a direct-current power source that is not shown in the figure. As shown in FIG. 3, a smoothing capacitor C2 is connected to the power source line. The capacitor C2 can be provided on the direct-current power source side that is not shown in the figure.

The structure of the output control circuit 5 is similar to that shown in FIG. 18. As shown in FIG. 3, the circuit 5 includes, for example, the delaying circuit 5a comprising a resistor R1 and a capacitor C1, and the switching circuit 5b such as an open collector circuit, etc., having a switching element SW4 such as a transistor, etc. The collector of the switching element SW4 is connected to the output terminal (B) of the oscillation circuit 4.

The resistor R1 is connected to the power source line via a resistor R2, and the lamp lighting control signal E is input to the connection point of the resistors R1 and R2. The lamp lighting control signal E is at a high level usually (when the lamp is not lit), and when the lamp is lit, it becomes a low level (grounding level).

Therefore, while the lamp is not lit, the base current flows in SW4 so as to be lit. At this time, the capacitor C1 is charged by Vbe of SW4. Therefore, the output B of the oscillation circuit 4 becomes the ground level and the driving circuit 3a does not operate. As described above, at the initial stage of the power input, the switch element SW4 is in the off state until the power voltage reaches up to the designated voltage, the capacitor C1 is charged and a sufficient base current flows in the switch element SW4.

When the lamp lighting control signal reaches the ground level, the electrical potential charge in the capacitor C1 is discharged via the resistor R1. Therefore, the potential at a point D becomes the low level and the switch element SW4 is turned off, and the output of the oscillation circuit 4 is input to the driving circuit 3a.

In order to prevent the lighting of the lamp 1 during the initial stage of the power input, the malfunction prevention circuit 6 that delays the operation of the oscillation circuit 4 and the driving circuit 3a during the initial stage of the power input is provided. The malfunction prevention circuit 6 comprises, in this embodiment, a delaying circuit 6a, that delays a supply of the power voltage to the oscillation circuit 4 and the driving circuit 3a when the power switch is lit.

Figure 4A:
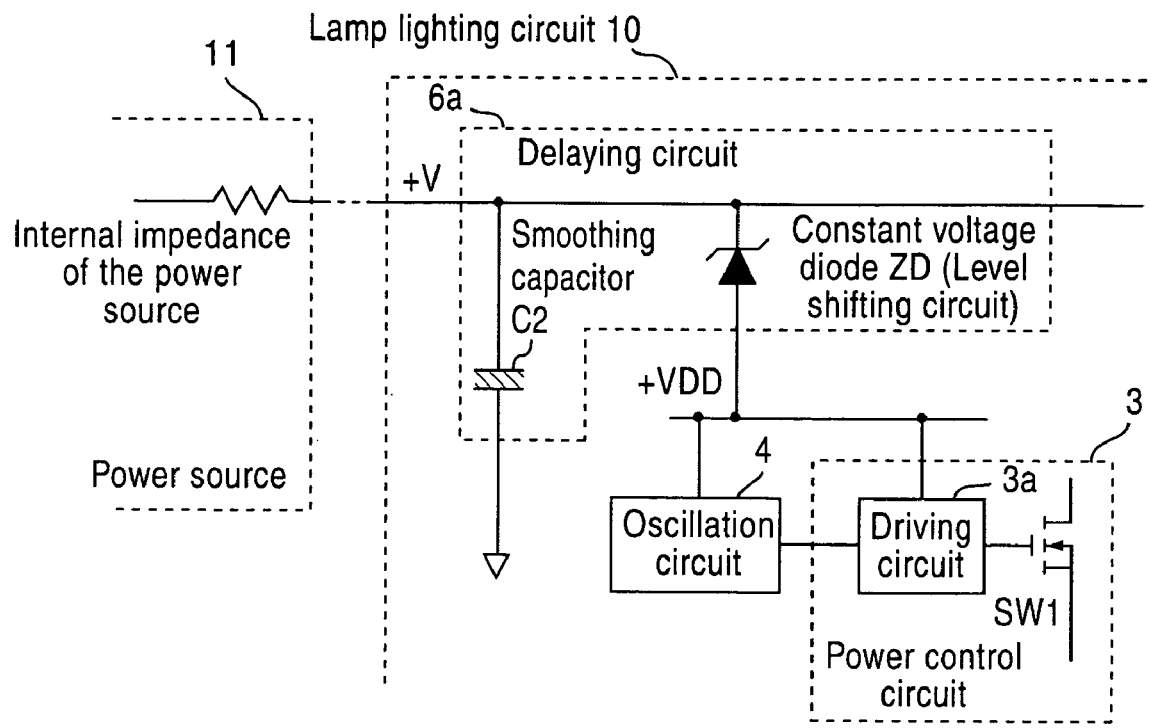
FIGS. 4A and 4B are views that show examples of the structure of a delaying circuit.

FIGS. 4A, 4B, 5A and 5B are views that show examples of the structure of the delaying circuit 6a. FIG. 4A shows an example of the delaying circuit 6a comprising a constant voltage diode ZD and a smoothing capacitor C2 in order to smooth the power voltage.

The constant voltage diode ZD functions as a level shifting circuit that delays a supply of the power to the oscillation circuit 4 and the driving circuit 3a when the power is lit, until the power voltage, which gradually increases due to the delay by the smoothing capacitor C2, exceeds voltage that starts conduction of the constant voltage diode ZD. The delay time can be changed by appropriately selecting the constant voltage diode ZD and setting the voltage that starts conduction of the constant voltage diode ZD.

Since such a smoothing capacitor is provided in the power source that supplies power to the lamp lighting circuit although in FIG. 4A the smoothing capacitor C2 is provided in the lamp lighting circuit, the smoothing capacitor in the lamp lighting circuit does not necessarily have to be provided.

When the delaying circuit 6a is structured as in FIG. 4A, a supply of the power voltage to the oscillation circuit 4 and the driving circuit 3a can be delayed by just adding the constant voltage diode ZD in the circuit. Therefore, the delaying circuit can be structured in an extremely inexpensive manner.

The delaying circuit shown in FIG. 4A is used as a detailed example of the circuit structure in the first embodiment.

Figure 4B:
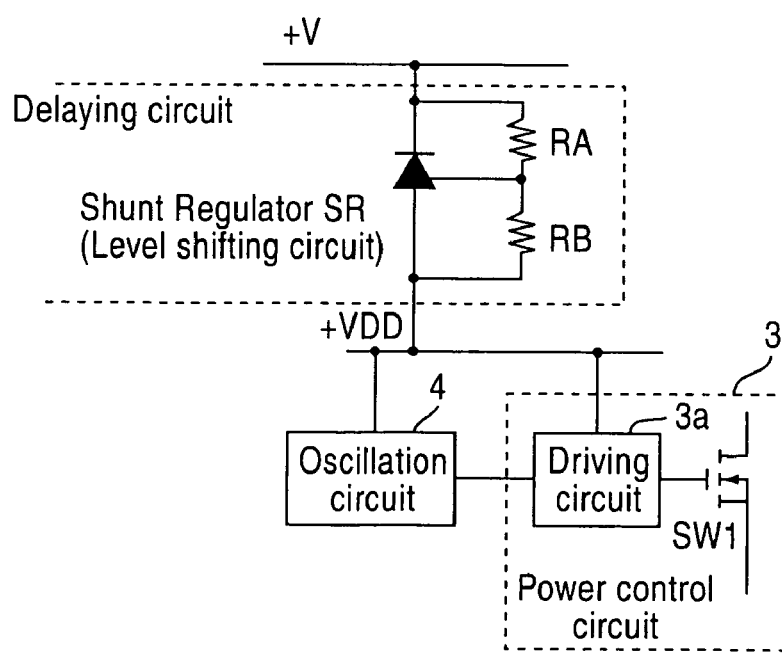

FIG. 4B shows another example of the delaying circuit 6a in which a shunt regulator SR is used, instead of the constant voltage diode. The shunt regulator SR has a function that controls the voltage between both terminals of the shunt regulator SR to a voltage that corresponds to the voltage dividing ratio of resistors RA and RB that are connected in parallel. Therefore, by changing the voltage dividing ratio of the resistors RA and RB, the level shift voltage can be changed and therefore, the delaying time can be changed.

Figure 5A:
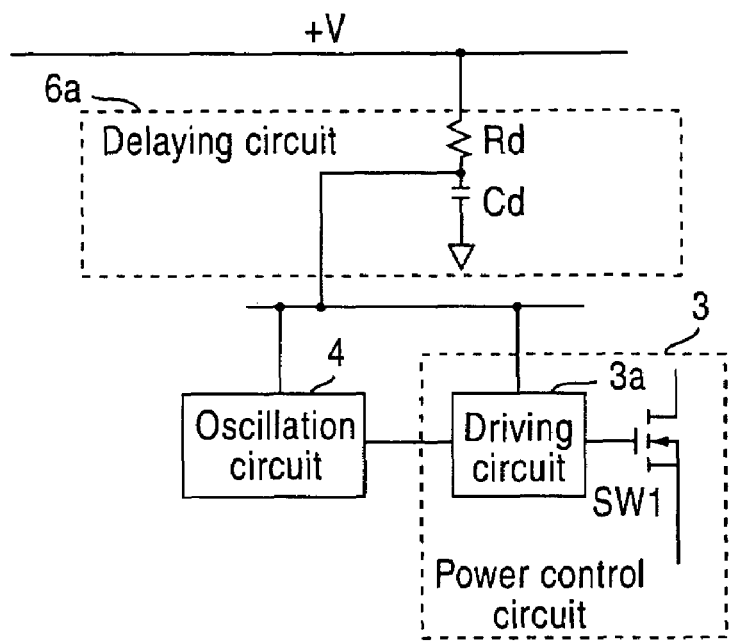
FIGS. 5A and 5B are views that show other examples of the structure of the delaying circuit.
Figure 5B:
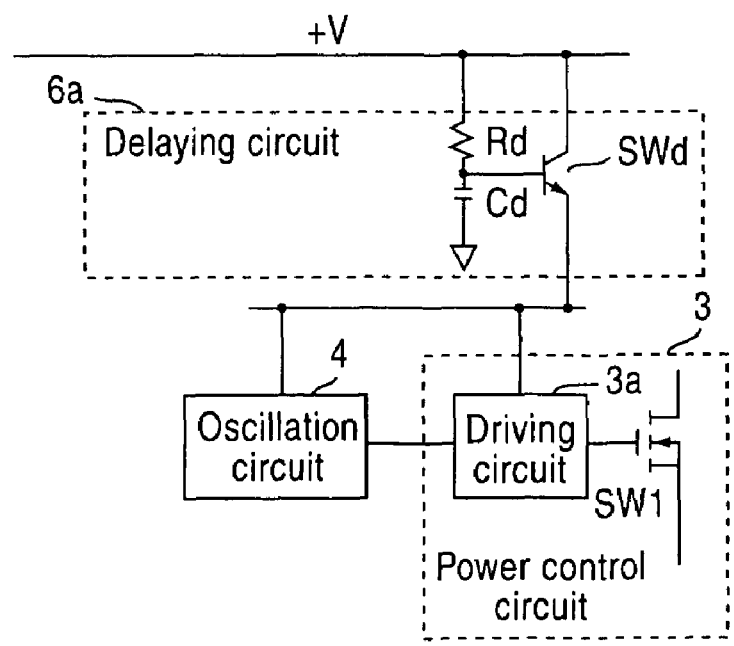

FIGS. 5A and 5BB show examples of the delaying circuit 6a having a primary delaying element that comprises a capacitor Cd and a resistor Rd. In FIG. 5A, the connecting point of the capacitor Cd and the resistor Rd is connected directly to the power supply line of the oscillation circuit 4 and the driving circuit 3a. In FIG. 5B, a switching element SWd is driven by the electrical potential of the connecting point of the capacitor Cd and the resistor Rd in which the power is supplied to the oscillation circuit 4 and the driving circuit 3a.

In any of the delaying circuits, the delaying time can be configured by the time constant of the primary delaying circuit.

The oscillation circuit 4 and the driving circuit 3a can be activated with a delay from the activation of the output control circuit 5 by the delaying circuit 6a which is the malfunction prevention circuit, and therefore, the lamp can be prevented from being tuned on when the power is lit.

In FIGS. 2 and 3, when a voltage of DC24V is applied to the lamp lighting circuit from the input power source, a power voltage that gradually increases along with time is applied to the series circuit of the transformer 2 and the power control element SW1, and the output control circuit 5.

Since the malfunction prevention circuit having the delaying circuit 6a is provided on the power source side of the oscillation circuit 4 and the driving circuit 3a, the power voltage is not immediately applied to the oscillation circuit 4 and the driving circuit 3a, so that the activation is delayed. In other words, the oscillation circuit 4 and the driving circuit 3a are not activated until the output control circuit 5 starts a normal operation.

Therefore, even if an output temporarily becomes a high impedance, the output of the driving circuit 3a is not input to the power control element SW1 until the output control circuit 5 starts the normal operation, so that the lamp 1 is not lit.

Then, after the output control circuit 5 starts the normal operation, the oscillation circuit 4 and the driving circuit 3a are activated. At that time, if the lamp lighting control signal E is at a high level, then the output of the output control circuit 5 becomes a low impedance and the output of the oscillation circuit 4 is not input to the driving circuit 3a and the lamp 1 maintains its non-lighting state.

After that, when the lamp lighting control signal E becomes a low level in order to light the lamp, the output of the output control circuit 5 becomes a high impedance and the output of the oscillation circuit 4 is input to the driving circuit 3a, and as described above, the power control element SW1 is driven so as to light the lamp 1.

Figure 6:
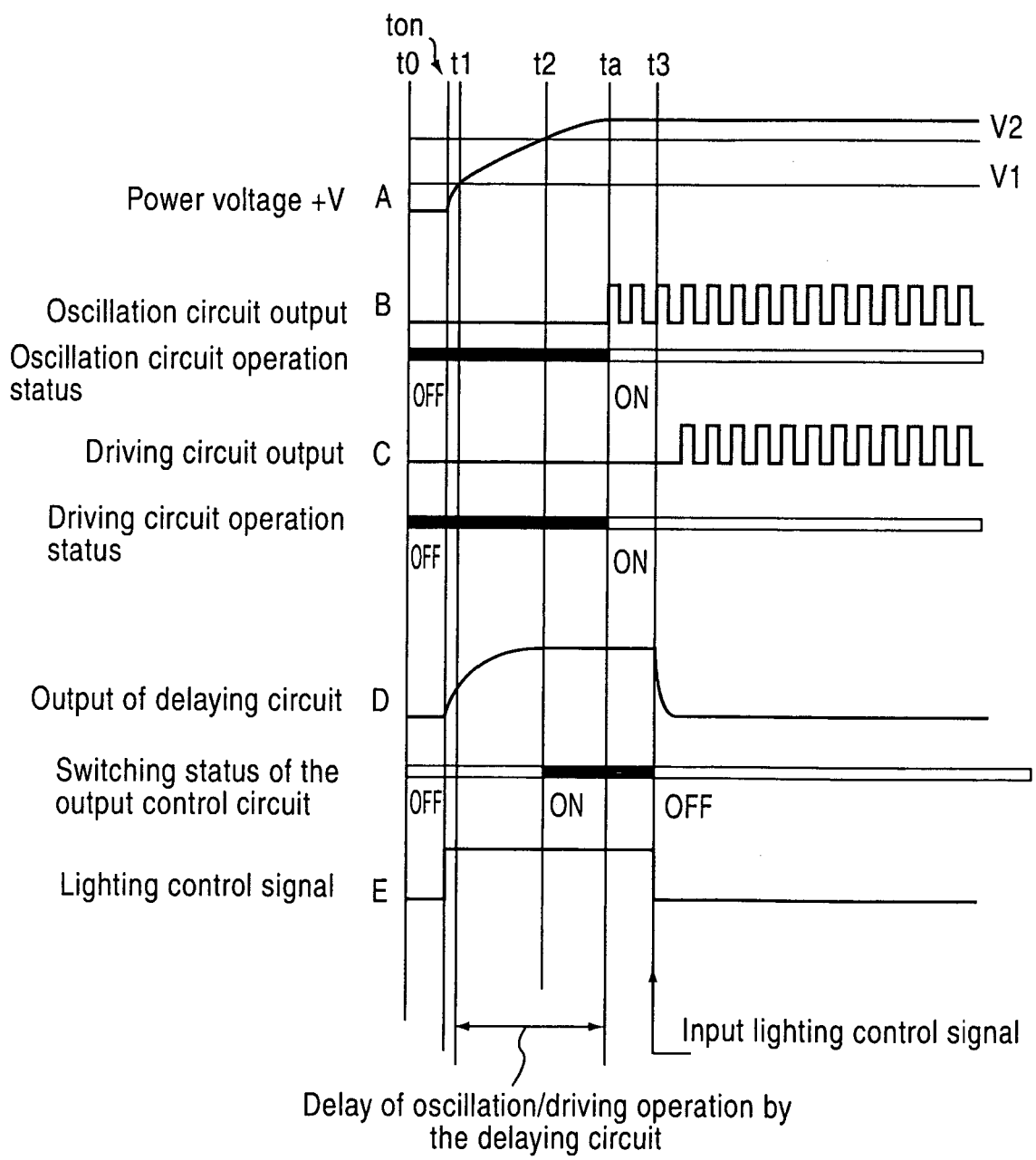
FIG. 6 is a time chart for explaining an operation of the first embodiment.

The operation of the present embodiment is described referring to a time chart shown in FIG. 6.

When the power of the lamp lighting circuit is lit at "ton" (refer to "Power voltage +V" of FIG. 6), the input power voltage A gradually increases and reaches the starting voltage V1 of the oscillation circuit 4 and the driving circuit 3a at "t1" in FIG. 6.

However, as described above, the delaying circuit 6a is connected to the oscillation circuit 4 and the driving circuit 3a, and as shown in "Oscillation circuit output", "Oscillation circuit operation status", "Driving circuit output", "Driving circuit operation status" of FIG. 6, the oscillation circuit 4 and the driving circuit 3a are not activated, and the signal B from the oscillation circuit 4 is not generated until time point "ta" (time point "t1" to "ta" in FIG. 6).

The output (potential at the point D) of the delaying circuit 5a of the output control circuit 5 is below the operation voltage of the switching circuit 5b as shown in "Output of delaying circuit" of FIG. 6, and therefore as shown in "Switching status of the output control circuit" of FIG. 6, the switching circuit 5b is off (until "t2" in FIG. 6) as if a lighting command is input (the lighting control signal E is a low level from time point "t1" to "t2" in FIG. 6.

However, since the delaying circuit 6a is connected to the oscillation circuit 4 and the driving circuit 3a, they do not operate. Therefore the signal (C) is not generated from the driving circuit 3a and the power control element SW1 is not activated from time point "t1" to "t2" in FIG. 6.

Subsequently, as shown in "Output of delaying circuit" and "Switching status of the output control circuit" of FIG. 6, the electrical potential of the output of the delaying circuit 5a of the output control circuit 5 increases and the switching circuit 5b of the output control circuit 5 is lit. Then the oscillation circuit 4 and driving circuit 3a are activated thereby entering the standby state for lighting from time points "t2" to "t3" in FIG. 6).

Then, the lamp lighting command is input at "t3" in FIG. 6, and as shown in "Lighting control signal" of FIG. 6, when the lighting control signal becomes a low level, the output (electrical potential at point D) of the delaying circuit 5a of the output control circuit 5 becomes a low level, and almost at the same time, the switching circuit 5b of the output control circuit 5 is turned off so that the output of the oscillation circuit 4 is transmitted to the power control element SW1 via the driving circuit 3a, and the power control element SW repeats ON/OFF operation based on the signal from the driving circuit 3a. When the power control element is lit, energy is accumulated in the transformer 2 by applying an electric current to the primary side coil of the transformer. In addition, when the power control element is turned off, the energy accumulated in the transformer imposes a high voltage that is the same or greater than the discharge starting voltage of the discharge lamp 1 on the secondary side coil due to the flyback operation of the transformer 2, thereby turning on the lamp 1 properly.

Figure 7:
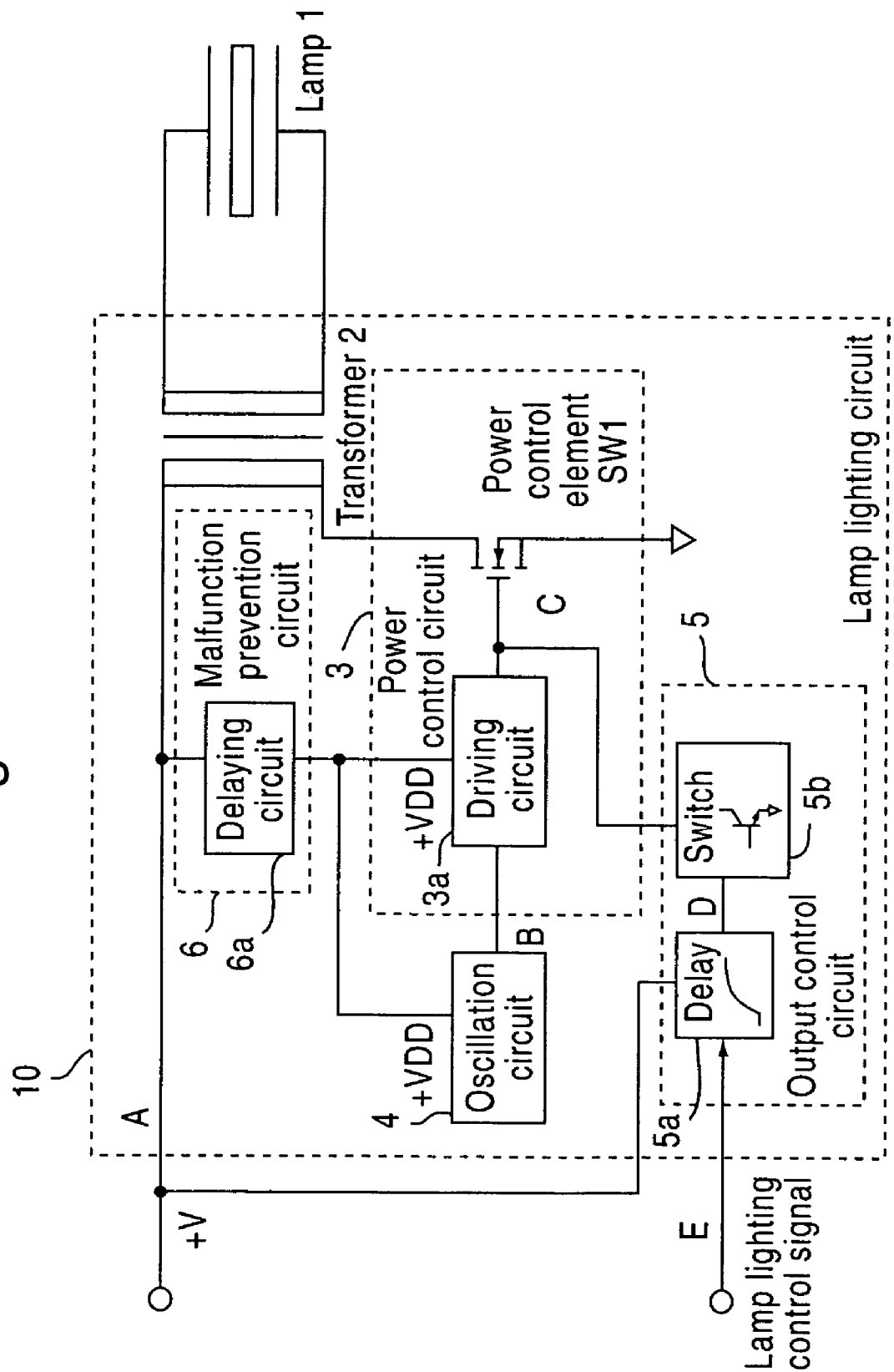
FIG. 7 is a view that shows a modified example of the first embodiment.

FIG. 7 is a view that shows a modified example of the above-mentioned first embodiment.

In the example shown in FIG. 2, the output terminal of the output control circuit 5 is connected to the output side of the oscillation circuit 4. In FIG. 7, the output terminal of the output control circuit 5 is connected to the output side terminal of the driving circuit 3*a*. The other structures are the same as those shown in FIGS. 2 and 3.

According to the present embodiment, the output of the output control circuit 5 is connected to the output side terminal of the driving circuit 3*a* and therefore, when the lamp lighting control signal E is at a high level (lamp 1 is not lit) and the switching circuit 5*b* of the output control circuit 5 is on, the output of the driving circuit 3*a* is maintained at a low level. Although the output of the oscillation circuit 4 is transmitted to the driving circuit 3*a*, the output of the driving circuit 3*a* is not input to the power control element SW1 and therefore the power control element SW1 is not activated.

The other operations are the same as those in the first embodiment, and the oscillation circuit 4 and the driving circuit 3*a* are not activated until the output control circuit 5 starts the normal operation. Until the output control circuit 5 starts normal operation, even if the output of the switching circuit 5*b* temporarily becomes a high impedance, the output of the driving circuit 3*a* is not input to the power control element SW1 so that the lamp 1 is not lit.

Figure 8:
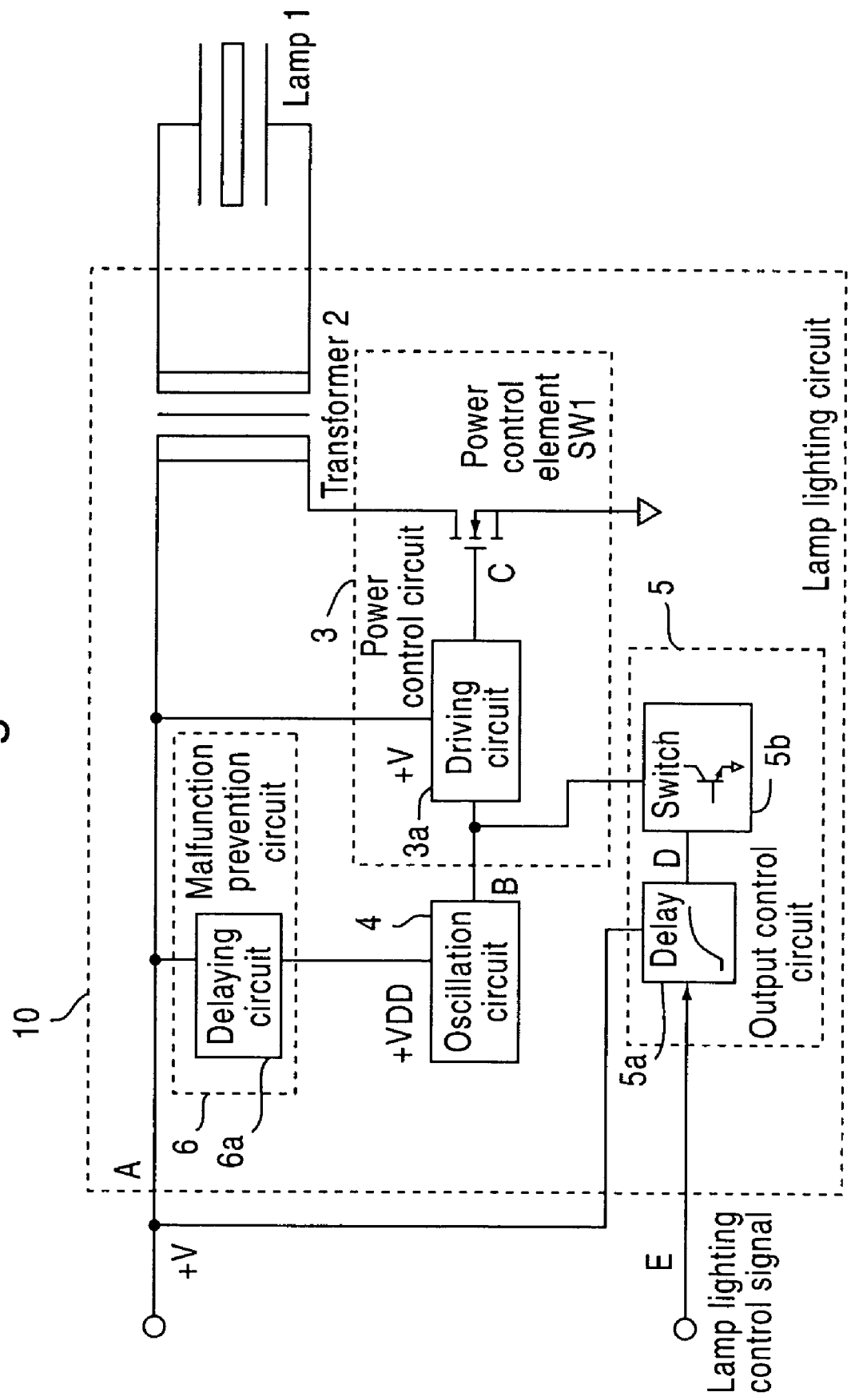
FIG. 8 is a block diagram of a second embodiment.

FIG. 8 is a block diagram of a second embodiment.

In the present embodiment, the malfunction prevention circuit 6 that comprises a delaying circuit 6*a* is provided only on the power source side of the oscillation circuit 4, and the driving circuit 3*a* is connected to the power source line A.

The activation of the oscillation circuit 4 can be delayed by the delaying circuit 6*a* provided on the power source side of the oscillation circuit 4, until the output control circuit 5 starts the normal operation. Even if the driving circuit 3*a* starts the operation in advance, the output of the oscillation circuit 4 is not input to the driving circuit 3*a*. Therefore, the output from the driving circuit 3*a* is not input to the power control element SW1 so that the power control element SW1 is not activated.

The other structures and operations are the same as those shown in FIGS. 2 and 3 and therefore a detailed circuit diagram is omitted.

Figure 9:
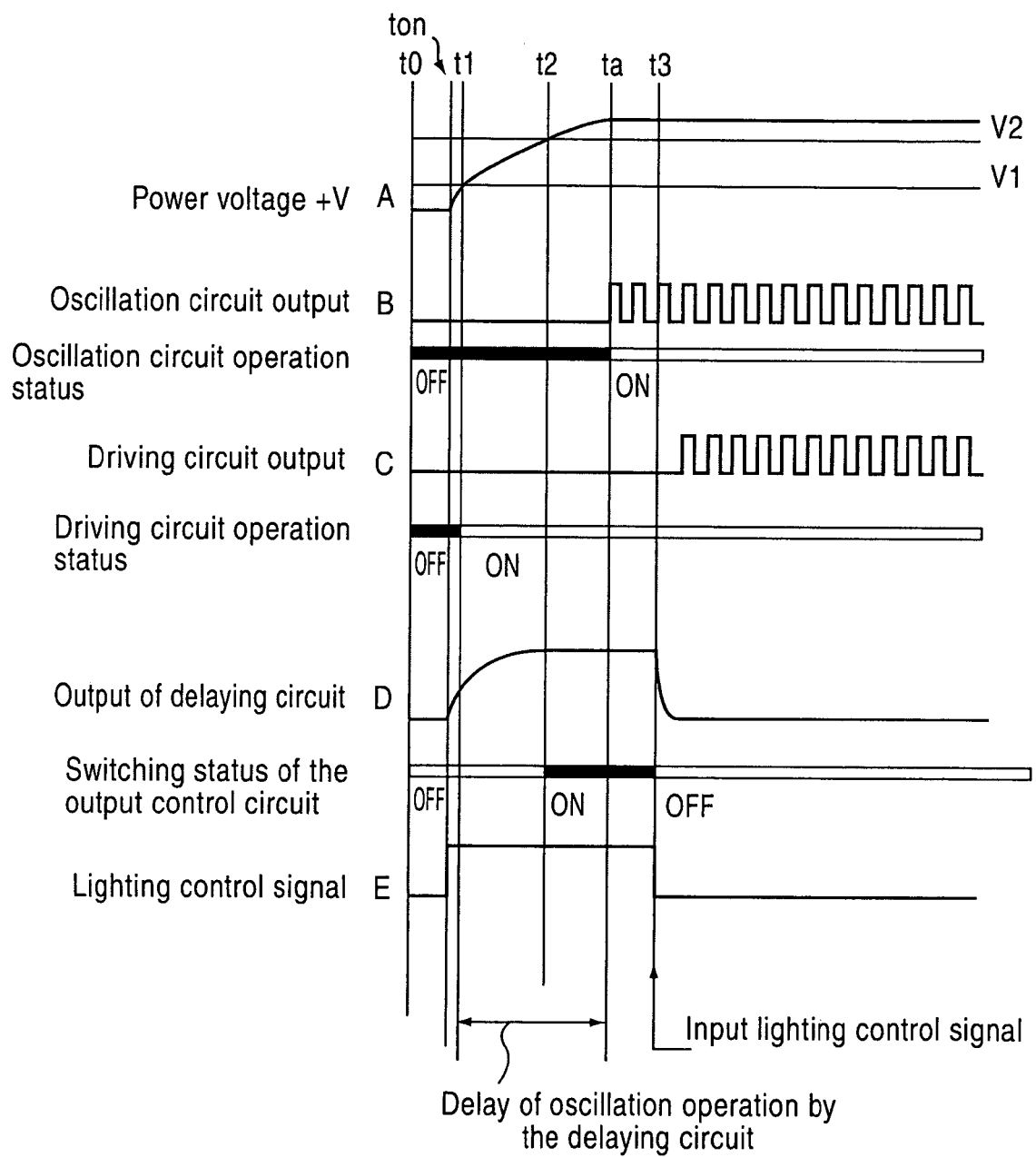
FIG. 9 is a time chart for explaining an operation of the second embodiment.

The operation of the present embodiment is described, referring to a time chart shown in FIG. 9.

When the power source of the lamp lighting circuit is lit (at time point "ton" in FIG. 9), as shown in "Power voltage +V" in FIG. 9, the input power voltage A gradually increases and reaches the starting voltage V1 of the oscillation circuit 4 and the driving circuit 3*a* at time point "t1" in FIG. 6.

However, as described above, since the delaying circuit 6*a* is connected to the oscillation circuit 4, as shown in "Oscillation circuit output" and "Oscillation circuit operation status" of FIG. 9, the oscillation circuit 4 is not activated and the signal B from the oscillation circuit 4 is not generated until time point "ta" (from time point "t1 to "ta" in FIG. 9). Since the delaying circuit 6*a* is not connected to the power source side of the driving circuit 3*a*, the driving circuit 3*a* is activated as shown in "Driving circuit operation status" in FIG. 9.

In addition, since the output (electrical potential at point D) of the delaying circuit 5*a* of the output control circuit 5 is, as shown in "Output of delaying circuit" of FIG. 6, lower than the operation voltage of the switching circuit 5*b*, as shown in "Switching status of the output control circuit" of FIG. 6, the switching circuit 5*b* is off until time point "t2" in FIG. 6, as if a lighting command is input (the lighting control signal E is a low level from "t1" to "t2" in FIG. 6.

However, since the delaying circuit 6*a* is connected to the oscillation circuit 4, the oscillation circuit 4 is not activated. Therefore the output (B) from the oscillation circuit 4 is not input to the driving circuit 3*a*, and as shown in "Driving circuit output" of FIG. 9, the signal (C) from the driving circuit 3*a* is not output and the power control element SW1 is not activated from time point "t1" to "t2" in FIG. 9.

Next, as shown in "Output of delaying circuit" and "Switching status of output control circuit" of FIG. 9, the electrical potential of the output of the delaying circuit 5*a* of the output control circuit 5 increases and the switching circuit 5*b* of the output control circuit 5 is lit. Then the oscillation circuit is activated and enters the standby state for lighting from "t2" to "t3" in FIG. 9.

Then the lamp lighting command is input at "t3" in FIG. 9, and as shown in "Lighting control signal" of FIG. 9, when the lighting control signal becomes a low level, the output (electrical potential at point D) of the delaying circuit 5*a* of the output control circuit 5 becomes a low level, and almost at the same time, the switching circuit 5*b* of the output control circuit 5 is turned off and the output of the oscillation circuit 4 is transmitted to the power control element SW1 via the driving circuit 3*a*, so that the power control element SW repeats ON/OFF operation based on the signal from the driving circuit 3*a* thereby lighting the lamp.

Figure 10:
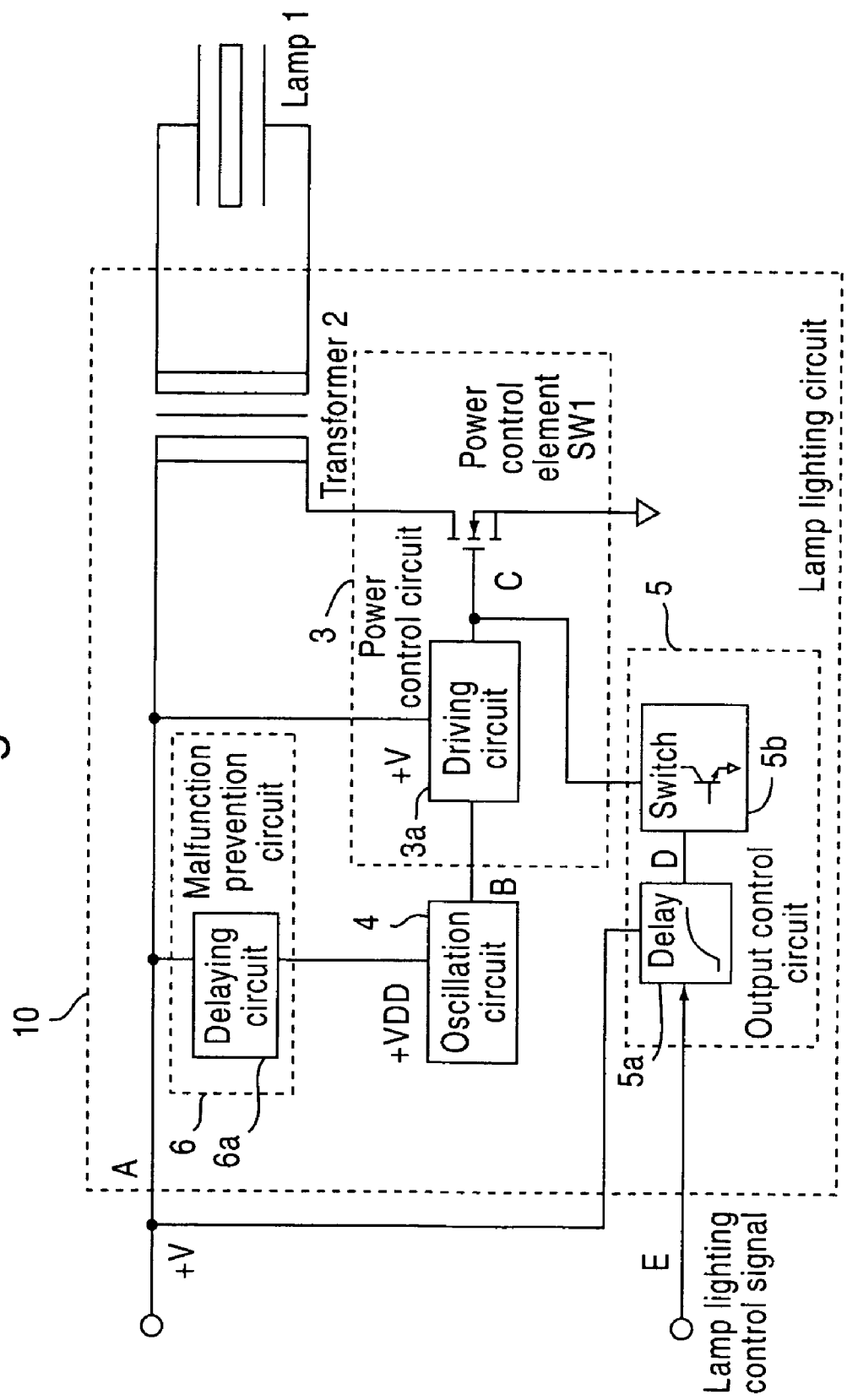
FIG. 10 is a view that shows a modified example of the second embodiment.

FIG. 10 is a view that shows a modified example of the second embodiment. In FIG. 8, the output of the output control circuit 5 is connected to the output side of the oscillation circuit 4. In FIG. 10, the output of the output control circuit 5 is connected to the output side of the driving circuit 3*a*. The other structures are the same as those shown in FIG. 8.

According to the present embodiment, since the output of the output control circuit 5 is connected to the output side of the driving circuit 3*a*, when the lamp lighting control signal E is at a high level (lamp 1 is not lit) and the switching circuit 5*b* of the output control circuit 5 is on, the output of the driving circuit 3*a* is maintained at a low level. Therefore, although the output of the oscillation circuit 4 is transmitted to the driving circuit 3*a*, the output of the driving circuit 3*a* is not input to the power control element SW1 so that the power control element SW1 is not activated.

The other operations are the same as in the second embodiment.

Figure 11:
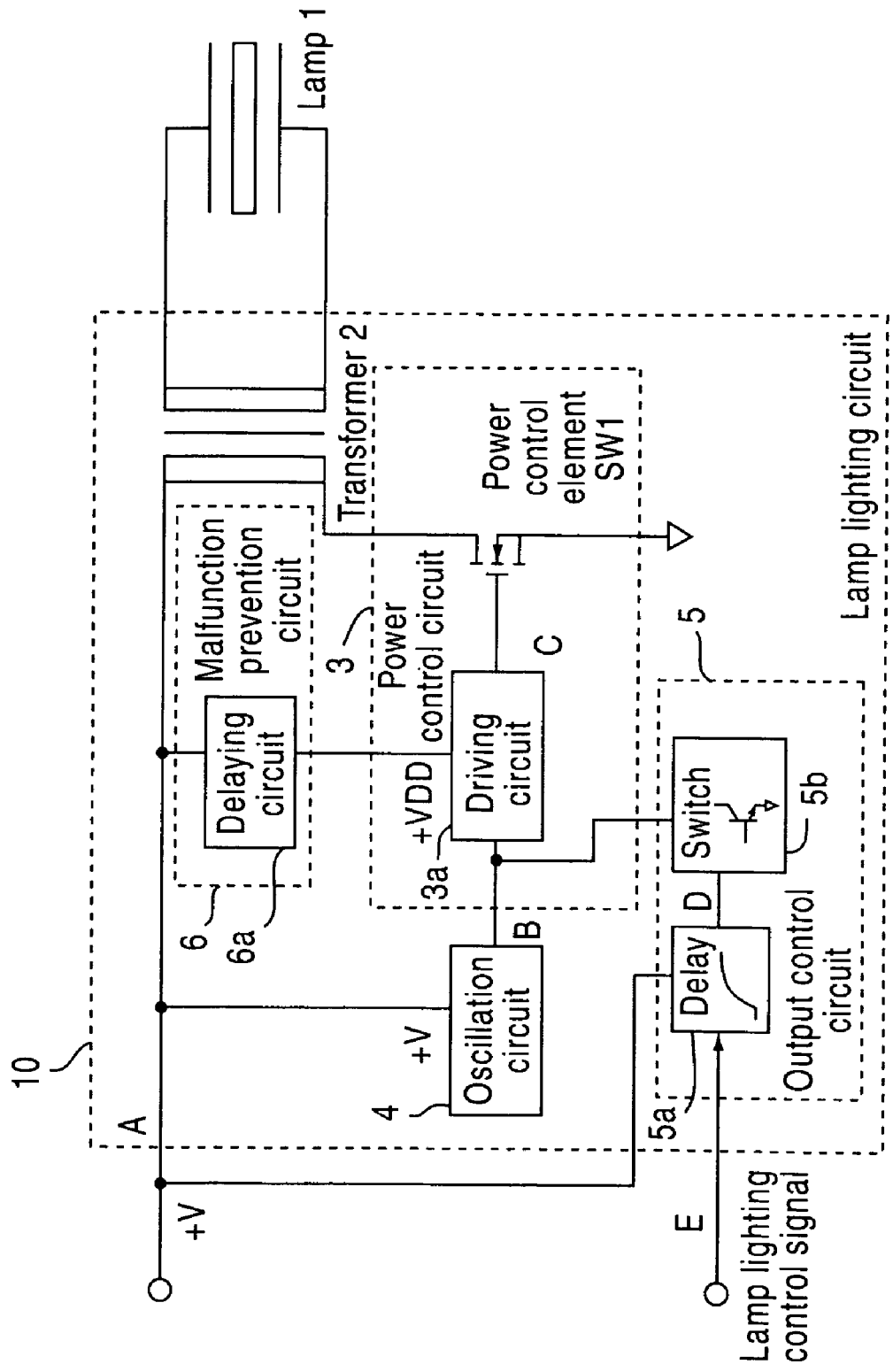
FIG. 11 is a block diagram of a third embodiment.

FIG. 11 is a block diagram of a third embodiment.

In the present embodiment, a malfunction prevention circuit 6 that comprises the delaying circuit 6*a* is provided only on the power source side of the driving circuit 3*a*, and the oscillation circuit 4 is connected to the power source line (A).

Since the activation of the driving circuit 3*a* can be delayed by the delaying circuit 6*a* provided on the power source side of the driving circuit 3*a*, until the output control circuit 5 starts the normal operation, even if the oscillation circuit is activated in advance, the driving circuit 3*a* is not activated. Therefore, the output from the driving circuit 3*a* is not input to the power control element SW1 so that the power control element SW1 is not activated.

The other structures and operations are the same as those shown in FIGS. 2 and 3 and therefore a detailed circuit diagram is omitted.

Figure 12:
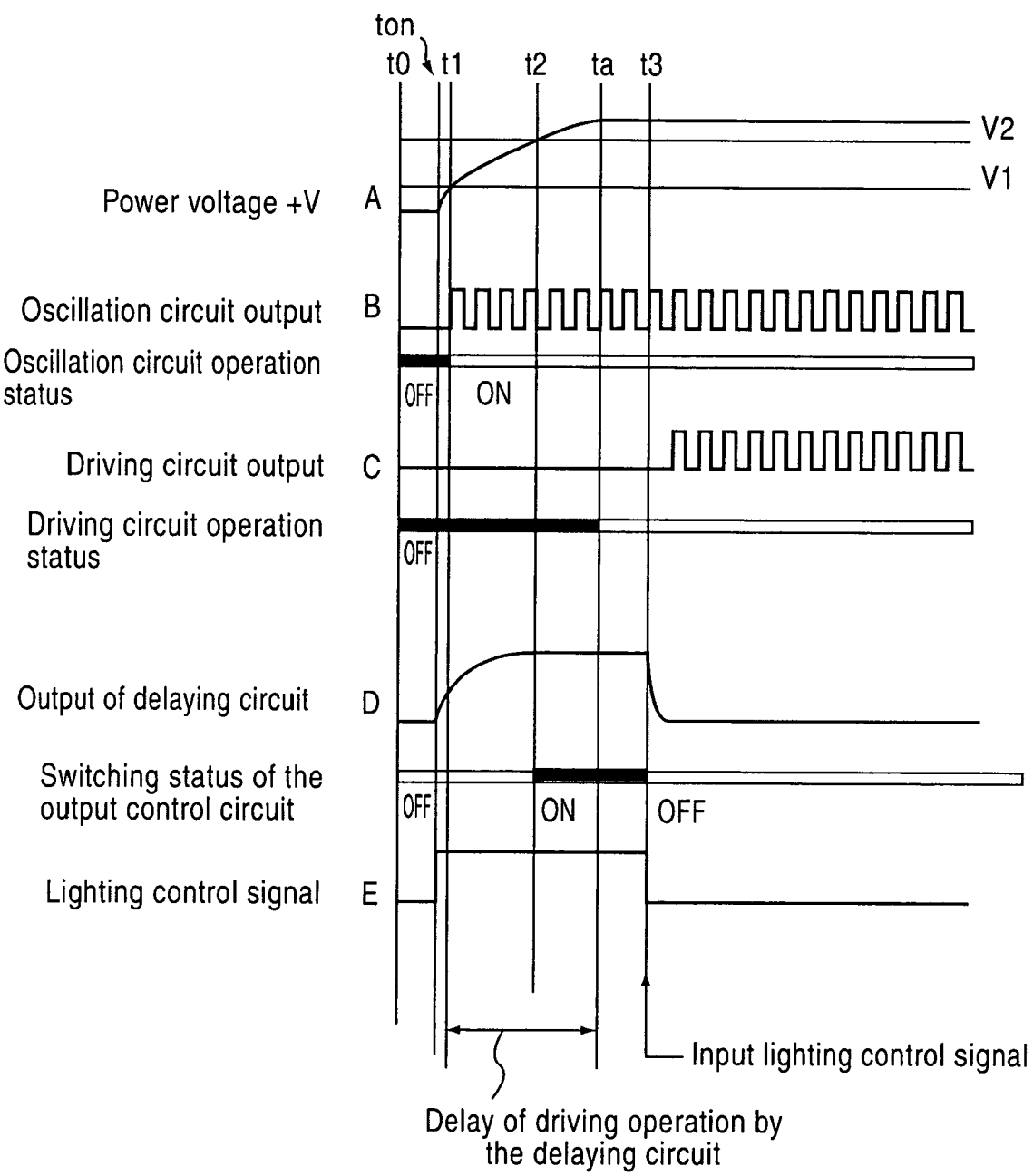
FIG. 12 is a time chart for explaining the operation of the third embodiment.

The operation of the present embodiment is described, referring to a time chart shown in FIG. 12.

When the power source of the lamp lighting circuit is lit (at time point "ton" in FIG. 12), as shown in "Power voltage +V" of FIG. 12, the input power voltage A gradually increases and reaches the starting voltage V1 of the oscillation circuit 4 and the driving circuit 3a at time point "t1" in FIG. 6. And therefore as shown in "Oscillation circuit output" and "Oscillation circuit operation status" of FIG. 12, the oscillation circuit 4 is activated.

However, as described above, since the delaying circuit 6a is connected to the driving circuit 3a, as shown in "Driving output circuit" and "Driving circuit operation status" of FIG. 12, the driving circuit 3a is not activated and the output from the driving circuit 3a is not generated until time point ta (from time point "t1" to "ta" in FIG. 12). In addition the output (electrical potential at point D) of the delaying circuit 5a of the output control circuit 5 is, as shown in "Output of delaying circuit" of FIG. 12, lower than the operation voltage of the switching circuit 5b, and therefore, as shown in "Switching status of the output control circuit" of FIG. 12, the switching circuit 5b is off (until time point "t2" in FIG. 12) as if a lighting command is input (the lighting control signal E is a low level) from time point "t1" to "t2" in FIG. 12. However, as described above, since the delaying circuit 6a is connected to the driving circuit 3a, the driving circuit 3a is not activated. Therefore as shown in "Driving circuit output of FIG. 12, the signal (C) from the driving circuit 3a is not output and the power control element SW1 is not activated from time point "t1" to "t2" in FIG. 12.

Next, as shown in "Output of delaying circuit" and "Switching status of the output control circuit" of FIG. 12, the electrical potential of the output of the delaying circuit 5a of the output control circuit 5 increases and the switching circuit 5b of the output control circuit 5 is lit. Then the driving circuit 3a is activated and enters the standby state for lighting (from "t2" to "t3" in FIG. 12).

Then the lamp lighting command is input (at "t3" in FIG. 12) and as shown in "Lighting control signal" of FIG. 12, when the lighting control signal becomes a low level, the output (electrical potential at point D) of the delaying circuit 5a of the output control circuit 5 becomes a low level, and almost at the same time, the switching circuit 5b of the output control circuit 5 is turned off and the output of the oscillation circuit 4 is transmitted to the power control element SW1 via the driving circuit 3a, so that the power control element SW repeats ON/OFF operation based on the signal from the driving circuit 3a thereby lighting the lamp.

Figure 13:
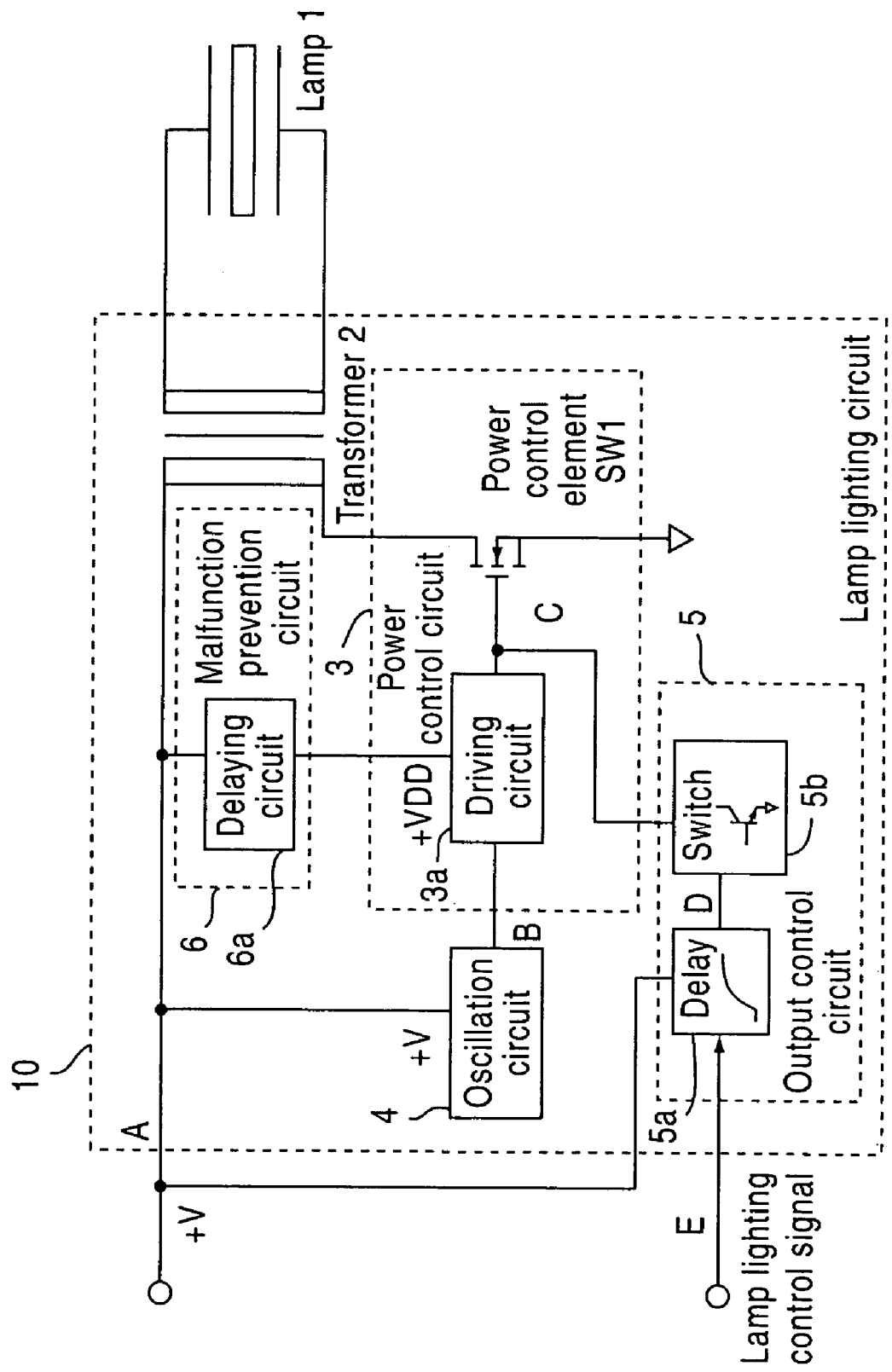
FIG. 13 is a view that shows a modified example of the third embodiment.

FIG. 13 is a view that shows a modified example of the third embodiment. In FIG. 11, the output of the output control circuit 5 is connected to the output side of the oscillation circuit 4. In FIG. 13, the output of the output control circuit 5 is connected to the output side of the driving circuit 3a. The other structures are the same as those shown in the FIG. 11.

According to the present embodiment, since the output of the output control circuit 5 is connected to the output side of the driving circuit 3a, when the lamp lighting control signal E is at a high level (lamp 1 is not lit) and the switching circuit 5b of the output control circuit 5 is on, and the output of the driving circuit 3a is maintained at a low level.

Therefore, although the output of the oscillation circuit 4 is transmitted to the driving circuit 3a, the output of the driving circuit 3a is not input to the power control element SW1 and the power control element SW1 is not activated.

The other operations are the same as those in the third embodiment.

Figure 14:
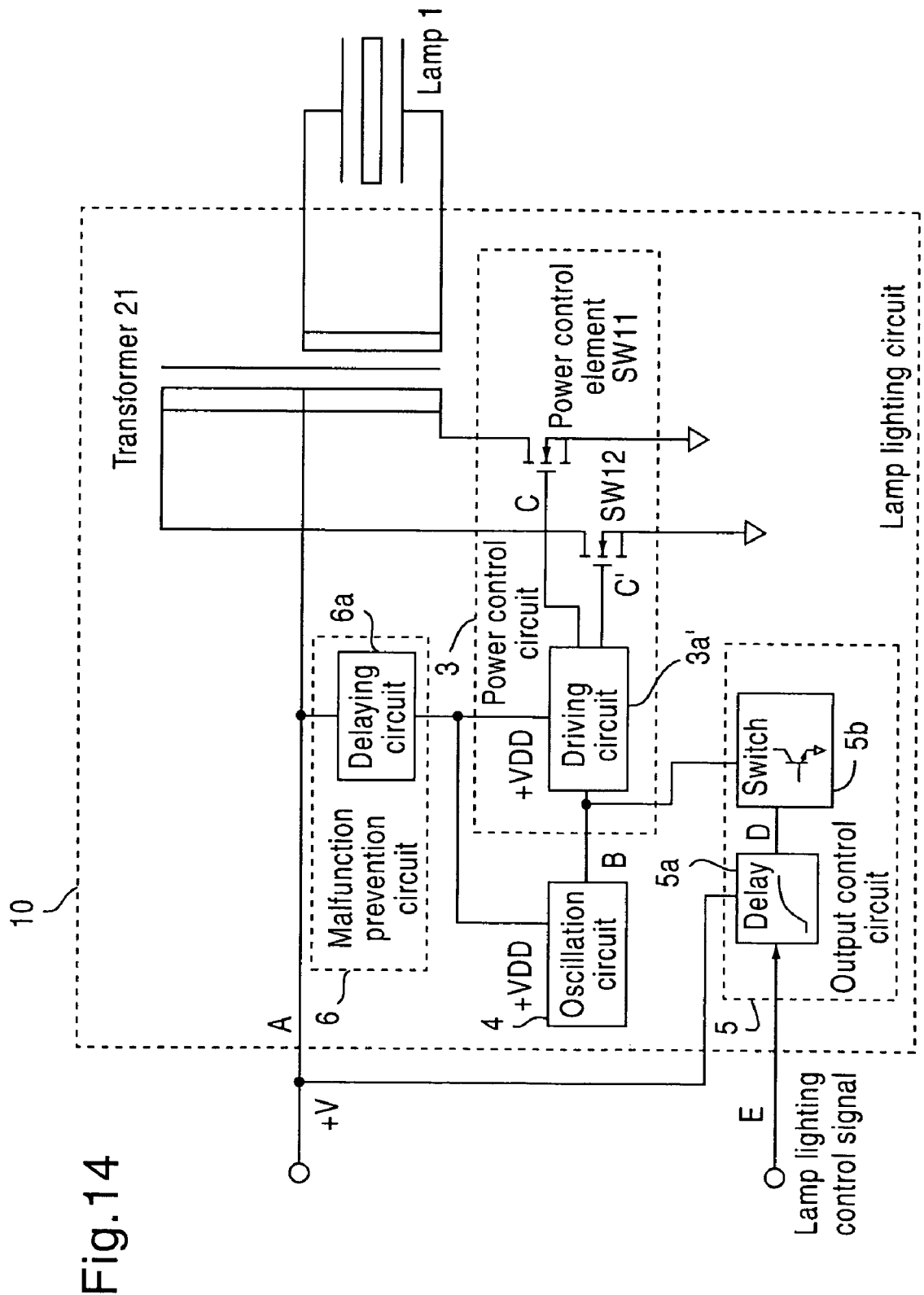
FIG. 14 is a block diagram of a fourth embodiment.

FIG. 14 is a block diagram of a fourth embodiment.

In the above-described embodiment, a flyback circuit is used as a boosting circuit. In the present embodiment, a push/pull circuit is used as a boosting circuit.

The push/pull circuit, as shown in FIG. 14, comprises first and second power control elements SW11 and SW12. Both terminals of the primary side coil of the transformer 21 are connected to the first and second power control elements SW11 and SW12, and the center tap of the transformer 21 is connected to the power source line.

In addition, in order to drive the first and second power control elements SW11 and SW12, the driving circuit 3a' divides the signal from the oscillation circuit 4 alternately, and outputs driving signals with two different phases.

In the structure, the signals with two different phases are output from the driving circuit 3a' and are provided to the first and second power control elements SW11 and SW12 so that the power control elements SW11 and SW12 repeat the on/off state alternately. When the power control elements SW11 or SW12 are activated, electric current flows on the primary side coil of the transformer 21 thereby generating a voltage that corresponds to the boosting ratio of the transformer 21 on the secondary side and a voltage that is the same as or greater than the discharge starting voltage of the lamp 1 is imposed so that lamp 1 is lit.

In accordance with the flyback circuit, although the voltage applied to the lamp 1 has the waveform of a sine half-wave pulse or a sine half-wave pulse including the attenuation oscillation, the push/pull circuit takes approximately a square shaped waveform.

The other structures are the same as those in the first embodiment, comprising the oscillation circuit 4, the circuit comprises a driving circuit 3a' that is driven by the output of the oscillation circuit 4 and which drives the power control elements SW11 and SW12, a output control circuit 5 that controls the lighting/non-lighting of the lamp, and a malfunction prevention circuit 6 that is comprised of a delaying circuit 6a.

The output of the output control circuit 5 is connected to the output side of the oscillation circuit 4 and when the lamp is not lit, the output of the output control circuit 5 becomes a low impedance so that the output of the oscillation circuit 4 is not transmitted to the driving circuit 3a'.

The delaying circuit 6a is, similarly to the first embodiment, provided on the power source side of the oscillation circuit 4 and the driving circuit 3a, and at the initial stage of the power input, it delays the activation of the oscillation circuit and the driving circuit 3a.

In this embodiment, the boosting circuit according to the first embodiment is replaced with a push/pull circuit. The boosting circuits according to the second and third embodiments can also be replaced with a push/pull circuit.

Figure 15:
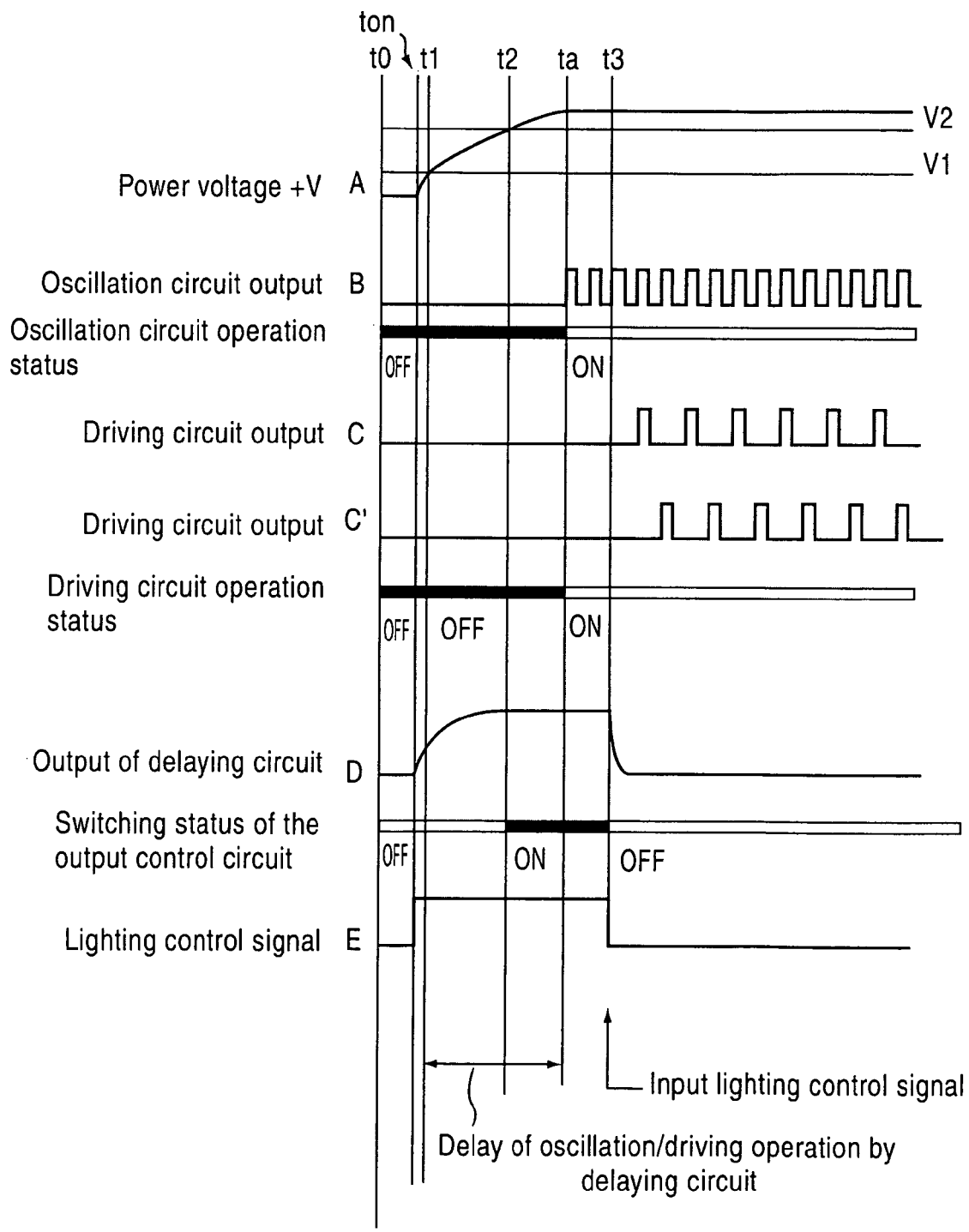
FIG. 15 is a time chart for explaining an operation of the fourth embodiment.

The operation of the present embodiment is described, referring to a time chart shown in FIG. 15.

When the power source of the lamp lighting circuit is lit (time point "ton" in FIG. 15), as shown in "Power voltage +V" of FIG. 15, the input power voltage A gradually increases and reaches the starting voltage V1 of the oscillation circuit 4 and the driving circuit 3a' (at time point "t1" in FIG. 15).

However, as described above, since the delaying circuit 6a is connected to the oscillation circuit 4 and the driving circuit 3a, as shown in "Oscillation circuit output", "Oscillation circuit output", "Oscillation circuit operation status", "Driving circuit output", "Driving circuit operation status" of FIG. 15, the oscillation circuit 4 and the driving circuit 3a are not activated and the signal B from the oscillation circuit 4 is not generated until time point "ta" (from time point "t1" to "ta" in FIG. 15).

In addition, the output (electrical potential at point D) of the delaying circuit 5a of the output control circuit 5 is, as shown in "Output of delaying circuit" of FIG. 15, lower than the operation voltage of the switching circuit 5b, and therefore, as shown in "Switching status of the output control unit" of FIG. 15, the switching circuit 5b is off (until time point "t2" in FIG. 15) as if a lighting command is input (the lighting control signal E is a low level) from time point "t1" to "t2" in FIG. 15.

However, as described above, since the delaying circuit 6a is connected to the oscillation circuit 4 and the driving circuit 3a', both circuits are not activated. Therefore the signal (C, C') from the driving circuit 3a is not output, and the power control elements SW11 and SW15 are not activated (time point t1 to t2 in FIG. 15).

Next, as shown in "Output of delaying circuit" and "Switching status of output control circuit" of FIG. 15, the electrical potential of the output of the delaying circuit 5a of the output control circuit 5 increases, and the switching circuit 5b of the output control circuit 5 is lit. Then the oscillation circuit 4 and the driving circuit 3a' are activated and enters the standby state for lighting (from "t2" to "t3" in FIG. 12.

Then the lamp lighting command is input (at "t3" in FIG. 15) and as shown in "Lighting control signal" of FIG. 15, when the lighting control signal becomes a low level, the output (electrical potential at point D) of the delaying circuit 5a of the output control circuit 5 becomes a low level, and almost at the same time, the switching circuit 5b of the output control circuit 5 is turned off and the output B of the oscillation circuit 4 is transmitted to the driving circuit 3a'. The driving circuit 3a' divides the signal from the oscillation circuit 4 alternately, and outputs driving signals with two different phases C and C'. The signals with two different phases C and C' are provided to the first and second power control elements SW11 and SW12 and the power control elements SW11 and SW12 repeat the on/off state alternately by the output of the driving circuit 3a'. By doing so, as described above, a voltage that corresponds to the boosting ratio of the transformer 21 is generated on the secondary side coil and the lamp 1 is lit.

Figure 16:
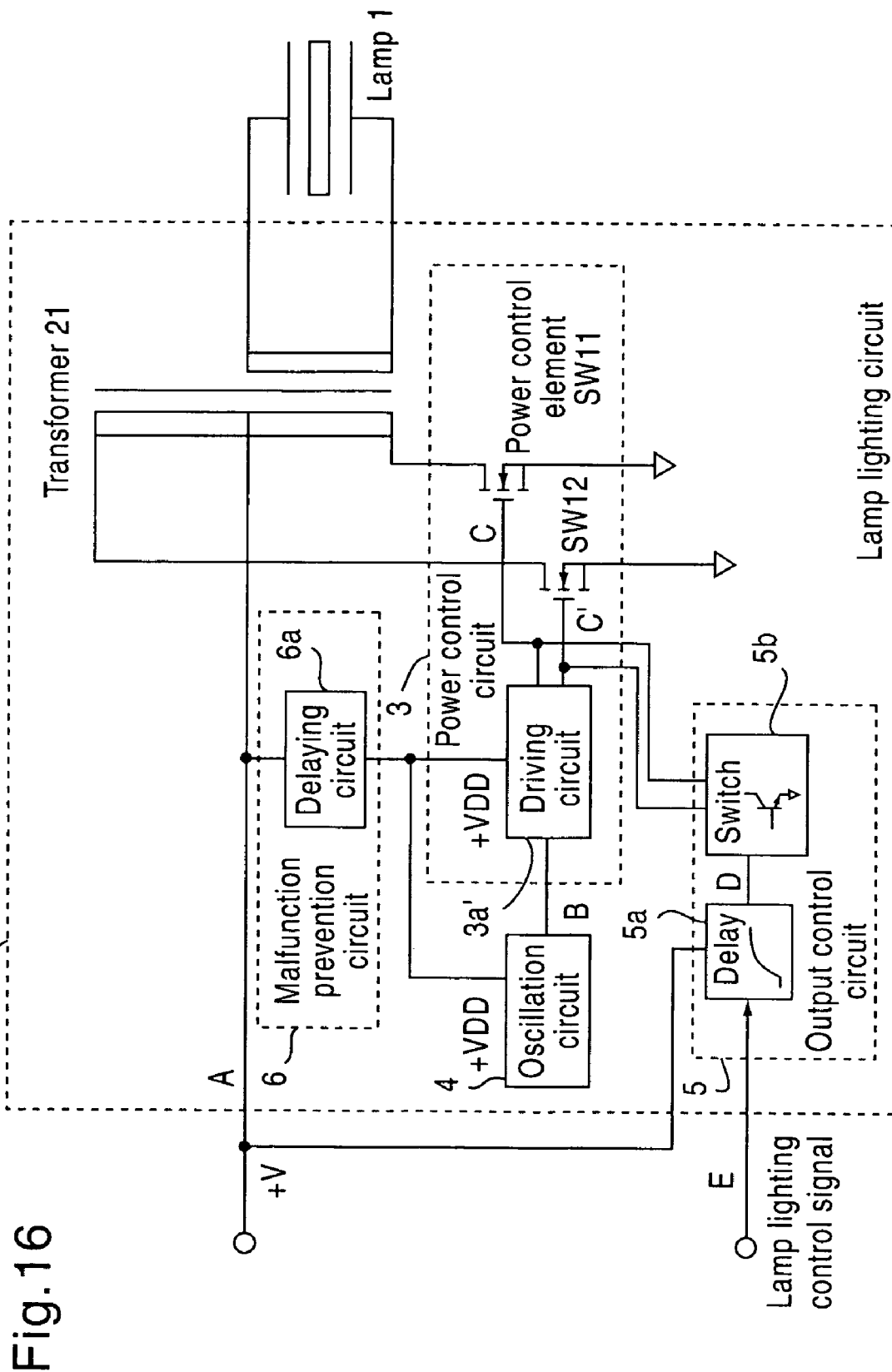
FIG. 16 is a view that shows a modified example of the fourth embodiment.

FIG. 16 is a view that shows a modified example of the fourth embodiment. In FIG. 14, the output of the output control circuit 5 is connected to the output side of the oscillation circuit 4. In FIG. 16, the output of the output control circuit 5 is connected to the output side of the driving circuit 3a'. The other structures are the same as those shown in FIG. 14.

According to the present embodiment, since the output of the output control circuit 5 is connected to the output side of the driving circuit 3a', when the lamp lighting control signal E is at a high level (lamp 1 is not lit) and the switching circuit 5b of the output control circuit 5 is on, the outputs C and C' of the driving circuit 3a' is maintained at a low level. Therefore, although the output of the oscillation circuit 4 is transmitted to the driving circuit 3a', the output of the driving circuit 3a' is not input to the power control elements SW11 and SW12 and therefore the power control elements SW11 and SW12 are not activated.

The other operations are the same as those in the fourth embodiment.

Although only some exemplary embodiments have been described in detail above, those skilled in the art will readily appreciate that many modifications are possible in the exemplary embodiments without materially departing from the novel teachings and advantages. Accordingly, all such modifications are intended to be included within the scope.

The disclosure of Japanese Patent Application No. 2004-360005 filed on Dec. 13, 2004 including specification, drawings and claims is incorporated herein by reference in its entirety.

What is claimed is:

1. A lamp lighting circuit for a rare gas fluorescent gas lamp having electrodes, in which at least one of the electrodes is provided on an external surface of a discharge container, and a fluorescent layer is provided inside of the container, and an excimer light generated by discharge is used, the lamp lighting circuit, comprising:
   an oscillation circuit;
   a power control circuit having a power control element;
   a boosting transformer that generates a high voltage applied to the rare gas fluorescent gas lamp according to switching of the power control element, in which the oscillation circuit and the power control circuit are connected to a primary side of the boosting transformer, and the rare gas fluorescent gas lamp is connected to the boosting transformer;
   wherein the power control element is controlled by the oscillation circuit, and transmits power to a boosting transformer; and
   an output control circuit that controls lighting of the rare gas fluorescent lamp,
   wherein the lighting circuit has a malfunction prevention circuit that inactivates lighting operation of the lamp after the power is lit until the output control circuit starts normal operation.

2. The lamp lighting circuit according to claim 1 wherein the malfunction prevention circuit comprises a delaying circuit that delays supply of the power to the oscillation circuit and/or a power control circuit until the output control circuit starts normal operation.

3. The lamp lighting circuit according to claim 2, wherein the delaying circuit comprises a constant voltage diode that shifts a level of the power voltage that increases along with passage of time.

4. The lamp lighting circuit according to claim 1, wherein the malfunction prevention circuit is connected to the oscillation circuit and the power control circuit.

5. The lamp lighting circuit according to claim 4, wherein an output terminal of the output control circuit is connected to an output side terminal of the oscillation circuit.

6. The lamp lighting circuit according to claim 4, wherein an output terminal of the output control circuit is connected to an output side terminal of the power control circuit.

7. The lamp lighting circuit according to claim 1, wherein the malfunction prevention circuit is connected to the oscillation circuit.

8. The lamp lighting circuit according to claim 7, wherein an output terminal of the output control circuit is connected to an output side terminal of the oscillation circuit.

9. The lamp lighting circuit according to claim 7, wherein an output terminal of the output control circuit is connected to an output side terminal of the power control circuit.

10. The lamp lighting circuit according to claim 1, wherein the malfunction prevention circuit is connected to the power control circuit.

11. The lamp lighting circuit according to claim 10, wherein an output terminal of the output control circuit is connected to an output side terminal of the oscillation circuit.

12. The lamp lighting circuit according to claim 10, wherein an output terminal of the output control circuit is connected to an output side terminal of the power control circuit.

* * * * *